(12) United States Patent
Jorud et al.

(10) Patent No.: US 11,788,398 B2
(45) Date of Patent: Oct. 17, 2023

(54) SAFE DRILL FLOOR ACCESS

(71) Applicant: SCHLUMBERGER TECHNOLOGY CORPORATION, Sugar Land, TX (US)

(72) Inventors: Anstein Jorud, Kristiansand (NO); Jarle Hardeland Oevsthus, Kristiansand (NO); Jan Alvaer, Kristiansand (NO)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 184 days.

(21) Appl. No.: 17/044,346

(22) PCT Filed: May 23, 2019

(86) PCT No.: PCT/US2019/033641
§ 371 (c)(1),
(2) Date: Oct. 1, 2020

(87) PCT Pub. No.: WO2019/231798
PCT Pub. Date: Dec. 5, 2019

(65) Prior Publication Data
US 2021/0102454 A1    Apr. 8, 2021

Related U.S. Application Data

(60) Provisional application No. 62/679,493, filed on Jun. 1, 2018.

(51) Int. Cl.
*E21B 44/00* (2006.01)
*G06Q 10/10* (2023.01)
(Continued)

(52) U.S. Cl.
CPC ............ *E21B 44/00* (2013.01); *E21B 19/084* (2013.01); *E21B 19/165* (2013.01); *E21B 41/00* (2013.01);
(Continued)

(58) Field of Classification Search
CPC ........ E21B 44/00; E21B 19/165; E21B 3/022; E21B 19/008; E21B 19/10; E21B 19/155;
(Continued)

(56) References Cited

U.S. PATENT DOCUMENTS

2013/0275100 A1    10/2013    Ellis et al.
2014/0067121 A1*   3/2014    Brooks ................. B25J 9/1676
                                                          700/255
(Continued)

FOREIGN PATENT DOCUMENTS

EP          2952671 A1      12/2015
JP       2003120728 A  *     4/2003
(Continued)

OTHER PUBLICATIONS

International Preliminary Report on Patentability issued in International Patent Application No. PCT/US2019/033641 dated Dec. 1, 2020, 10 pages.
(Continued)

*Primary Examiner* — Joseph H Feild
*Assistant Examiner* — Rufus C Point
(74) *Attorney, Agent, or Firm* — Cameron R. Sneddon

(57) ABSTRACT

Systems and methods for safe drill floor access. An example method includes commencing operation of a processing device to operate a system for maintaining safety of a human worker in a restricted area of a drill floor during drilling operations. The processing device may receive a presence detection signal and output a first stop control command to the equipment to cause the equipment to stop operating. The
(Continued)

processing device may receive an entry request signal, output an entry request indicator via an output device to a human driller within a drill rig control center, receive an entry grant input from the human driller granting entry to the human worker to enter the restricted area, and output a second stop control command to the equipment located in the restricted area to cause the equipment to stop operating in response to the received entry grant input.

20 Claims, 4 Drawing Sheets

(51) Int. Cl.
| | |
|---|---|
| *G06Q 50/02* | (2012.01) |
| *G06Q 50/26* | (2012.01) |
| *G07C 9/00* | (2020.01) |
| *G08B 7/06* | (2006.01) |
| *E21B 19/16* | (2006.01) |
| *G07C 9/30* | (2020.01) |
| *F16P 3/14* | (2006.01) |
| *G08B 21/02* | (2006.01) |
| *G08B 21/18* | (2006.01) |
| *E21B 19/084* | (2006.01) |
| *E21B 41/00* | (2006.01) |
| *E21B 3/02* | (2006.01) |
| *E21B 19/00* | (2006.01) |
| *E21B 19/10* | (2006.01) |
| *E21B 19/15* | (2006.01) |

(52) U.S. Cl.
CPC ............... *F16P 3/14* (2013.01); *G06Q 10/10* (2013.01); *G06Q 50/02* (2013.01); *G06Q 50/265* (2013.01); *G07C 9/00* (2013.01); *G07C 9/30* (2020.01); *G08B 7/06* (2013.01); *G08B 21/02* (2013.01); *G08B 21/18* (2013.01); *E21B 3/022* (2020.05); *E21B 19/008* (2013.01); *E21B 19/10* (2013.01); *E21B 19/155* (2013.01); *E21B 19/161* (2013.01)

(58) Field of Classification Search
CPC .......... E21B 19/161; E21B 19/08; F16P 3/14; G06Q 10/10; G06Q 50/02; G06Q 50/265; G07C 9/00; G07C 9/30; G08B 7/06; G08B 21/02; G08B 21/18
See application file for complete search history.

(56) References Cited

U.S. PATENT DOCUMENTS

| | | | |
|---|---|---|---|
| 2014/0290768 A1 | 10/2014 | Randle et al. | |
| 2015/0240615 A1* | 8/2015 | Dykstra | E21B 44/005 |
| | | | 700/275 |
| 2016/0224013 A1* | 8/2016 | Endou | G05B 9/02 |
| 2017/0001312 A1* | 1/2017 | Watanabe | F16P 3/142 |
| 2017/0011571 A1* | 1/2017 | Boles | G07C 9/30 |
| 2017/0057088 A1* | 3/2017 | Watanabe | B25J 9/1674 |
| 2017/0213404 A1* | 7/2017 | Sivalingam | G07C 9/257 |
| 2017/0236397 A1* | 8/2017 | Myslenski | H04N 7/183 |
| | | | 348/143 |
| 2018/0364693 A1* | 12/2018 | Harshbarger | F16P 3/147 |
| 2019/0348057 A1* | 11/2019 | Schloss | B62D 33/0604 |
| 2020/0160682 A1* | 5/2020 | Johnson | G06V 40/10 |
| 2021/0003736 A1* | 1/2021 | Noguchi | G01V 5/0008 |

FOREIGN PATENT DOCUMENTS

| | | |
|---|---|---|
| WO | 2015123045 A1 | 8/2015 |
| WO | 2016178069 A1 | 11/2016 |

OTHER PUBLICATIONS

International Search Report and Written Opinion issue in International Patent Application No. PCT/US2019/033641 dated Sep. 5, 2019, 13 pages.

Exam Report under Section 18(3) issued in United Kingdom Patent Application GB2018441.2 dated Dec. 14, 2022, 4 pages.

* cited by examiner

SAFE DRILL FLOOR ACCESS

CROSS-REFERENCE TO RELATED APPLICATIONS

This application is the National Stage of International Application No. PCT/US2019/033641, filed May 23, 2019, which claims priority to and the benefit of U.S. Provisional Application No. 62/679,493, titled "SAFE DRILL FLOOR ACCESS," filed Jun. 1, 2018. Both applications are hereby incorporated herein by reference.

BACKGROUND OF THE DISCLOSURE

Wells are generally drilled into the ground or ocean bed to recover natural deposits of oil, gas, and other materials that are trapped in subterranean formations. Well construction operations (e.g., drilling operations) may be performed at a wellsite by a well construction system (e.g., drilling rig) having various automated surface and subterranean equipment operating in a coordinated manner. For example, a drive mechanism, such as a top drive located at a wellsite surface, can be utilized to rotate and advance a drill string into a subterranean formation to drill a wellbore. The drill string may include a plurality of drill pipes coupled together and terminating with a drill bit. Length of the drill string may be increased by adding additional drill pipes while depth of the wellbore increases.

The wellsite equipment is typically monitored and controlled from a control center of the well construction system. A typical control center houses a control workstation operable to receive sensor measurements from various sensors associated with the wellsite equipment and permit monitoring of the wellsite equipment. The control workstation may also facilitate automated control of the wellsite equipment and/or manual control of the wellsite equipment by an equipment operator.

Certain wellsite equipment located on a drill floor of the well construction system may be configured for automatic operation, whereby a single equipment operator (e.g., a driller) can control such drill floor equipment via the control workstation. However, other rig workers (e.g., maintenance personnel, mechanics) may be required to enter the drill floor to perform certain operations (e.g., setting a dog collar, replacing elevator slips or inserts). Some automated equipment located on the drill floor can hit or crush a rig worker and, thus, pose a grave safety risk to the personnel working on the drill rig floor. Personnel working on the drill floor therefore rely on the equipment operator at the control workstation to seize equipment operations on the drill floor. The equipment operator, therefore, has to be aware of presence and location of the rig workers located on the drill floor and otherwise possess high situational awareness of the drill floor at all times to minimize hazardous situations and injuries. The risk is increased due to the number of automated machines, the relatively small size of the drill floor, and blind spots where the equipment operator has no line of sight.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus including a system for maintaining safety of a human worker in a restricted area of a drill floor during drilling operations performed at least partially by equipment located in the restricted area. The system includes multiple presence detection sensors each disposed on the drill floor and operable to output a presence detection signal indicative of detection of the human worker entering the restricted area. The system also includes an entry input device disposed on the drill floor and operable to output an entry request signal when manually operated by the human worker intending to enter the restricted area. The system also includes a processing device including a processor and a memory storing computer program code. The processing device is communicatively connected with the equipment, the presence detection sensors, and the entry input device. The processing device is operable to receive the presence detection signal, output a first stop control command to the equipment to cause the equipment to stop operating in response to the received presence detection signal, receive the entry request signal, output an entry request indicator via an output device to a human driller within a drill rig control center in response to the received entry request signal, receive an entry grant input from the human driller granting entry to the human worker to enter the restricted area, and output a second stop control command to the equipment located in the restricted area to cause the equipment to stop operating in response to the received entry grant input.

The present disclosure also introduces an apparatus including a system for maintaining safety of a human worker in a restricted area of a drill floor during drilling operations performed at least partially by equipment located in the restricted area, the system including a manually operated presence confirmation sensor and a processing device. The manually operated presence confirmation sensor is disposed in the restricted area away from a movement path of the equipment and is operable to output a presence confirmation signal when manually operated by the human worker in the restricted area. The processing device includes a processor and a memory storing computer program code and is communicatively connected with the equipment and the manually operated presence confirmation sensor. The processing device is operable to receive the presence confirmation signal and to output limited operation control commands to the equipment located in the restricted area to cause the equipment to start operating in a limited manner in response to the received presence confirmation signal.

The present disclosure also introduces a method including commencing operation of a processing device to operate a system for maintaining safety of a human worker in a restricted area of a drill floor during drilling operations performed at least partially by equipment located in the restricted area. The processing device receives a presence detection signal indicative of detection of the human worker entering the restricted area, outputs a first stop control command to the equipment to cause the equipment to stop operating in response to the received presence detection signal, receives an entry request signal indicative of intent of the human worker to enter the restricted area, outputs an entry request indicator via an output device to a human driller within a drill rig control center in response to the received entry request signal, receives an entry grant input from the human driller granting entry to the human worker to enter the restricted area, and outputs a second stop control command to the equipment located in the restricted area to cause the equipment to stop operating in response to the received entry grant input.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
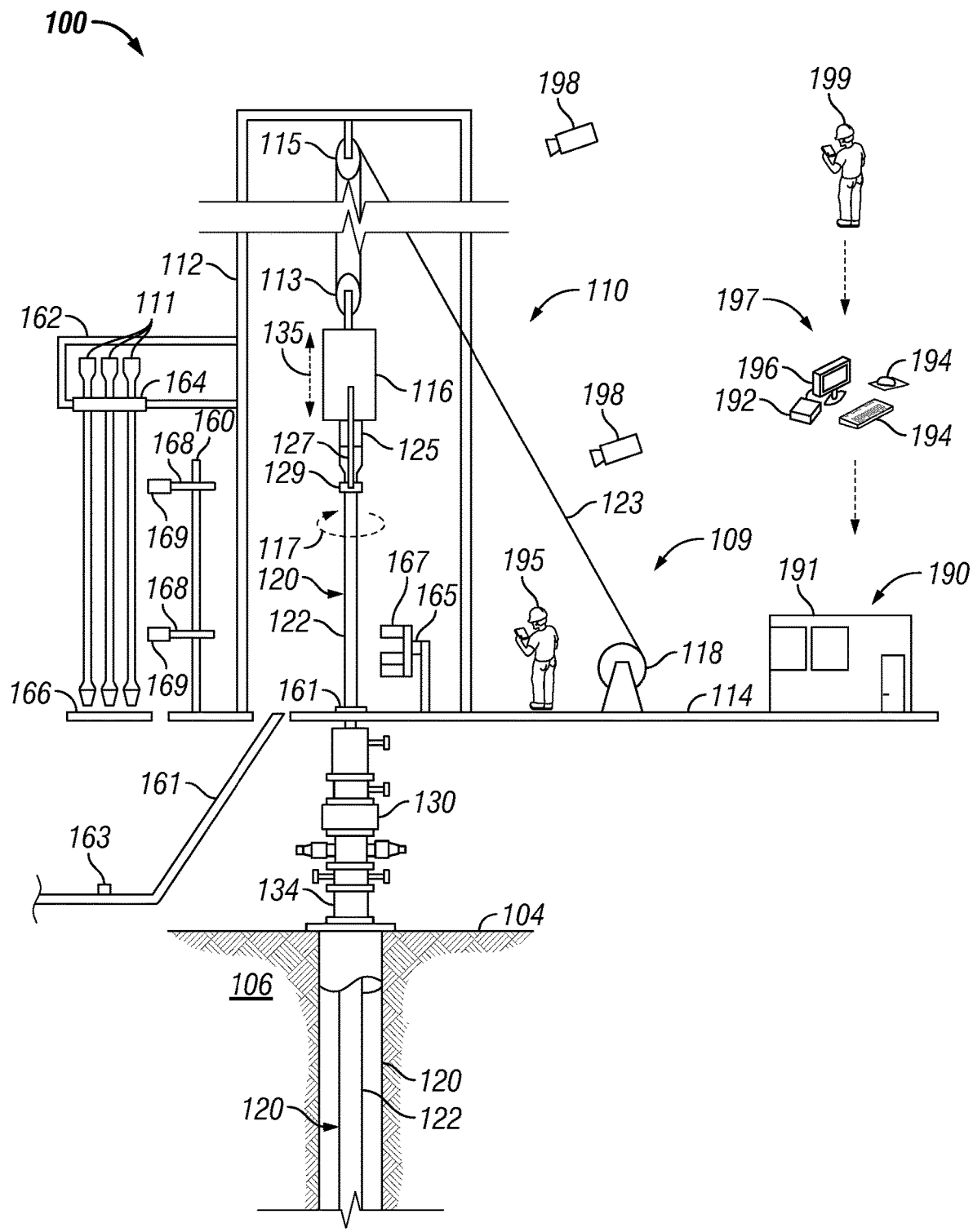
FIG. 1 is a schematic view of at least a portion of an example implementation of apparatus according to one or more aspects of the present disclosure.

It is to be understood that the following disclosure provides many different implementations, or examples, for implementing different features of various implementations. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various implementations and/or configurations discussed.

FIG. 1 is a schematic view of at least a portion of an example implementation of a well construction system 100 according to one or more aspects of the present disclosure. The well construction system 100 represents an example environment in which one or more aspects of the present disclosure described below may be implemented. The well construction system 100 may be or comprise a drilling rig and associated wellsite equipment. Although the well construction system 100 is depicted as an onshore implementation, the aspects described below are also applicable to offshore implementations.

The well construction system 100 is depicted in relation to a wellbore 102 formed by rotary and/or directional drilling from a wellsite surface 104 and extending into a subterranean formation 106. The well construction system 100 includes a drill string 120 suspended within the wellbore 102 and surface equipment 110 disposed above the wellsite surface 104. The surface equipment 110 may comprise a drill floor 114 (i.e., drill rig floor) and drill floor equipment 109 supported by or otherwise located at the drill floor 114. The surface equipment 110 may include a mast, a derrick, and/or another support structure 112 disposed over the drill floor 114. The drill string 120 may be suspended within the wellbore 102 from the support structure 112. The support structure 112 and the drill floor 114 are collectively supported over the wellbore 102 by legs and/or other support structures (not shown). The surface equipment 110 may further include fluid control equipment 130 for maintaining well pressure control and for controlling fluid being discharged from the wellbore 102. The fluid control equipment 130 may be mounted on top of a wellhead 134.

The drill string 120 may comprise a bottom-hole assembly (BHA) (not shown) and means 122 for conveying the BHA within the wellbore 102. The conveyance means 122 may comprise drill pipe, heavy-weight drill pipe (HWDP), wired drill pipe (WDP), tough logging condition (TLC) pipe, and/or other means for conveying the BHA within the wellbore 102. A downhole end of the BHA 124 may include or be coupled to a drill bit (not shown). Rotation of the drill bit and the weight of the drill string 120 collectively operate to form the wellbore 102. The drill bit may be rotated by a driver at the wellsite surface 104 and/or via a downhole mud motor (not shown) connected with the drill bit.

The support structure 112 may support the driver, such as a top drive 116, operable to connect (perhaps indirectly) with an upper end of the drill string 120, and to impart rotary motion 117 and vertical motion 135 to the drill string 120. However, another driver, such as a kelly and a rotary table (neither shown), may be utilized in addition to or instead of the top drive 116 to impart the rotary motion 117 to the drill string 120. The top drive 116 and the connected drill string 120 may be suspended from the support structure 112 via a hoisting system or equipment, which may include a traveling block 113, a crown block 115, and a drawworks 118 storing a support cable or line 123. The crown block 115 may be connected to or otherwise supported by the support structure 112, and the traveling block 113 may be coupled with the top drive 116. The drawworks 118 may be mounted on or otherwise supported by the drill floor 114. The crown block 115 and traveling block 113 comprise pulleys or sheaves around which the support line 123 is reeved to operatively connect the crown block 115, the traveling block 113, and the drawworks 118 (and perhaps an anchor). The drawworks 118 may thus selectively impart tension to the support line 123 to lift and lower the top drive 116, resulting in the vertical motion 135. The drawworks 118 may comprise a drum, a base, and a prime mover (e.g., an engine or motor) (not shown) operable to drive the drum to rotate and reel in the support line 123, causing the traveling block 113 and the top drive 116 to move upward. The drawworks 118 may be operable to reel out the support line 123 via a controlled rotation of the drum, causing the traveling block 113 and the top drive 116 to move downward.

The top drive 116 may comprise a grabber, a swivel (neither shown), elevator links 127 terminating with an elevator 129, and a drive shaft 125 operatively connected with a prime mover (not shown), such as via a gear box or transmission (not shown). The drive shaft 125 may be selectively coupled with the upper end of the drill string 120 and the prime mover may be selectively operated to rotate the drive shaft 125 and the drill string 120 coupled with the drive shaft 125. Hence, during drilling operations, the top drive 116, in conjunction with operation of the drawworks 118, may advance the drill string 120 into the formation 106 to form the wellbore 102. The elevator links 127 and the elevator 129 of the top drive 116 may handle tubulars (e.g., drill pipes, drill collars, casing joints, etc.) that are not mechanically coupled to the drive shaft 125. For example, when the drill string 120 is being tripped into or out of the wellbore 102, the elevator 129 may grasp the tubulars of the drill string 120 such that the tubulars may be raised and/or lowered via the hoisting equipment mechanically coupled to the top drive 116. The top drive 116 may have a guide system (not shown), such as rollers that track up and down a guide rail on the support structure 112. The guide system may aid in keeping the top drive 116 aligned with the wellbore 102, and in preventing the top drive 116 from rotating during drilling by transferring reactive torque to the support structure 112.

The surface equipment 110 may include a tubular handling system or equipment operable to store, move, connect, and disconnect tubulars (e.g., drill pipes) to assemble and disassemble the conveyance means 122 of the drill string 120 during drilling operations. For example, a catwalk 161 may be utilized to convey tubulars from a ground level, such as along the wellsite surface 104, to the drill floor 114, permitting the elevator 129 to grab and lift the tubulars above the wellbore 102 for connection with previously deployed tubulars. The catwalk 161 may have a horizontal portion and an inclined portion that extends between the horizontal portion and the drill floor 114. The catwalk 161 may comprise a skate 163 movable along a groove (not shown) extending longitudinally along the horizontal and inclined portions of the catwalk 161. The skate 163 may be operable to convey (e.g., push) the tubulars along the catwalk 161 to the drill floor 114. The skate 163 may be driven along the groove by a drive system (not shown), such as a pulley system or a hydraulic system. Additionally, one or more racks (not shown) may adjoin the horizontal portion of the catwalk 161. The racks may have a spinner unit for transferring tubulars to the groove of the catwalk 161.

An iron roughneck 165 may be positioned on the drill floor 114. The iron roughneck 165 may comprise a torqueing portion 167, such as may include a spinner and a torque wrench comprising a lower tong and an upper tong. The torqueing portion 167 of the iron roughneck 165 may be moveable toward and at least partially around the drill string 120, such as may permit the iron roughneck 165 to make up and break out connections of the drill string 120. The torqueing portion 167 may also be moveable away from the drill string 120, such as may permit the iron roughneck 165 to move clear of the drill string 120 during drilling operations. The spinner of the iron roughneck 165 may be utilized to apply low torque to make up and break out threaded connections between tubulars of the drill string 120, and the torque wrench may be utilized to apply a higher torque to tighten and loosen the threaded connections.

A set of slips 161 may be located on the drill floor 114, such as may accommodate therethrough the drill string 120 during tubular make up and break out operations, tubular running operations, and drilling operations. The slips 161 may be in an open position during running and drilling operations to permit advancement of the drill string 120, and in a closed position to clamp the upper end (e.g., uppermost tubular) of the drill string 120 to thereby suspend and prevent advancement of the drill string 120 within the wellbore 102, such as during the make up and break out operations. A human wellsite operator 195 (e.g., a drill floor worker or other personnel) may work on the drill floor 114, such as to operate or repair one or more pieces of the drill floor equipment 109.

During drilling operations, the hoisting system lowers the drill string 120 while the top drive 116 rotates the drill string 120 to advance the drill string 120 downward within the wellbore 102 and into the formation 106. During the advancement of the drill string 120, the slips 161 may be in an open position, and the iron roughneck 165 may move away or otherwise clear of the drill string 120. When the upper end of the drill string 120 (i.e., upper end of the uppermost tubular of the drill string 120) connected to the drive shaft 125 is near the slips 161 and/or the drill floor 114, the top drive 116 may cease rotating and the slips 161 may close to clamp the upper end of the drill string 120. The grabber of the top drive 116 may then clamp the uppermost tubular connected to the drive shaft 125, and the drive shaft 125 may rotate in a direction reverse from the drilling rotation to break out the connection between the drive shaft 125 and the uppermost tubular. The grabber of the top drive 116 may then release the uppermost tubular.

Multiple tubulars may be loaded on the rack of the catwalk 161 and individual tubulars may be transferred from the rack to the groove in the catwalk 161, such as by the spinner unit. The tubular positioned in the groove may be conveyed along the groove by the skate 163 until the box end of the tubular projects above the drill floor 114. The elevator 129 of the top drive 116 may then grasp the protruding box end, and the drawworks 118 may be operated to lift the top drive 116, the elevator 129, and the new tubular.

The hoisting system may then raise the top drive 116, the elevator 129, and the new tubular until the tubular is aligned with the upper portion of the drill string 120 clamped by the slips 161. The iron roughneck 165 may move toward the drill string 120, and the lower tong of the torqueing portion 167 clamps onto the upper end of the drill string 120. The spinning system may threadedly connect the lower end (i.e., pin end) of the new tubular with the upper end (i.e., box end) of the drill string 120. The upper tong may then clamp onto the new tubular and rotate with high torque to complete making up the connection with the drill string 120. In this manner, the new tubular becomes part of the drill string 120. The iron roughneck 165 may then release and move clear of the drill string 120.

The grabber of the top drive 116 may then clamp onto the drill string 120. The drive shaft 125 may be brought into contact with the upper end of the drill string 120 (e.g., the box end of the uppermost tubular) and rotated to make up a connection between the drill string 120 and the drive shaft 125. The grabber may then release the drill string 120, and the slips 161 may move to the open position. The drilling operations may then resume.

The tubular handling equipment may further include a tubular handling manipulator (THM) 160 disposed in association with a vertical pipe rack 162 for storing tubulars 111 (e.g., drill pipes, drill collars, drill pipe stands, casing joints, etc.). The vertical pipe rack 162 may comprise or support a fingerboard 164 defining a plurality of slots configured to support or otherwise hold the tubulars 111 within or above a setback 166 (e.g., a platform or another area) located adjacent to, along, or below the drill floor 114. The fingerboard 164 may comprise a plurality of fingers (not shown), each associated with a corresponding slot and operable to close around and/or otherwise interpose individual tubulars 111 to maintain the tubulars 111 within corresponding slots of the fingerboard 164. The vertical pipe rack 162 may be connected with and supported by the support structure 112 or another portion of the wellsite system 100. The fingerboard 164/setback 166 provide storage (e.g., temporary storage) of tubulars 111 during various operations, such as during and between drill string tripping operations. The THM 160 may be operable to transfer the tubulars 111 between the fingerboard 164/setback 166 and the drill string 120 (i.e., space above the suspended drill string 120). For example, the THM 160 may include arms 168 terminating with clamps 169, such as may be operable to grasp and/or clamp onto a single tubular 111. The arms 168 of the THM 160 may extend and retract, and/or at least a portion of the THM 160 may be rotatable and/or movable toward and away from the drill string 120, such as may permit the THM 160 to transfer the tubulars 111 between the fingerboard 164/setback 166 and the drill string 120.

To trip out the drill string 120, the top drive 116 may be raised and the slips 161 and the elevator 129 may be closed around the drill string 120. The grabber of the top drive 116 may clamp the upper end of a tubular of the drill string 120 coupled to the drive shaft 125. The drive shaft 125 may then rotate in a direction reverse from the drilling rotation to break out the connection between the drive shaft 125 and the drill string 120. The grabber of the top drive 116 may then release the tubular of the drill string 120, and the drill string 120 may be suspended by (at least in part) the elevator 129. The iron roughneck 165 may then be moved toward the drill string 120. The lower tong may clamp onto a lower tubular below a connection of the drill string 120, and the upper tong may clamp onto an upper tubular above that connection. The upper tong may then rotate the upper tubular to provide a high torque to break out the connection between the upper and lower tubulars. The spinning system may then rotate the upper tubular to separate the upper and lower tubulars, such that the upper tubular is suspended above the drill floor 114 by the elevator 129. The iron roughneck 165 may then release the drill string 120 and move clear of the drill string 120.

The THM 160 may then move toward the drill string 120 to grasp the tubular suspended from the elevator 129. The elevator 129 may then open to release the tubular. The THM 160 may then move away from the drill string 120 while grasping the tubular with the clamps 169, place the tubular in the fingerboard 164/setback 166, and release the tubular for storage. This process may be repeated until the intended length of drill string 120 is removed from the wellbore 102.

The surface equipment 110 of the well construction system 100 may also comprise a control center 190 from which various portions of the well construction system 100, such as the top drive 116, the hoisting system, the tubular handling system, the drilling fluid circulation system, the well control system, the BHA, among other examples, may be monitored and controlled. The control center 190 may be located at or adjacent to drill floor 114 or another location of the well construction system 100. The control center 190 may comprise a facility 191 (e.g., a room, a cabin, a trailer, etc.) containing a control workstation 197, which may be operated by a human wellsite operator 199 (e.g., driller) to monitor and control various wellsite equipment or portions of the well construction system 100. The control workstation 197 may comprise or be communicatively connected with a processing device 192 (e.g., a controller, a computer, etc.), such as may be operable to receive, process, and output information to monitor operations of and provide control to one or more portions of the well construction system 100. For example, the processing device 192 may be communicatively connected with the various surface and downhole equipment described herein, and may be operable to receive signals from and transmit signals to such equipment to perform various operations described herein. The processing device 192 may store executable program code, instructions, and/or operational parameters or set-points, including for implementing one or more aspects of methods and operations described herein. The processing device 192 may be located within and/or outside of the facility 191.

The control workstation 197 may be operable for entering or otherwise communicating control commands to the processing device 192 by the wellsite operator 199, and for displaying or otherwise communicating information from the processing device 192 to the wellsite operator 199. The control workstation 197 may comprise a plurality of human-machine interface (HMI) devices, including one or more input devices 194 (e.g., a keyboard, a mouse, a joystick, a touchscreen, etc.) and one or more output devices 196 (e.g., a video monitor, a touchscreen, a printer, audio speakers, etc.). Communication between the processing device 192, the input and output devices 194, 196, and the various wellsite equipment may be via wired and/or wireless communication means. However, for clarity and ease of understanding, such communication means are not depicted, and a person having ordinary skill in the art will appreciate that such communication means are within the scope of the present disclosure.

The well construction system 100 may also include stationary and/or mobile video cameras 198 disposed or utilized at various locations of the well construction system 100. The video cameras 198 may capture videos of various portions, equipment, or subsystems of the well construction system 100, and perhaps the wellsite operators 195, their location, and the actions they perform, during or otherwise in association with the wellsite operations, including while performing repairs to the well construction system 100 during a breakdown. For example, the video cameras 198 may capture videos of the entire well construction system 100 and/or specific portions of the well construction system 100, such as the drill floor 114, the top drive 116, the iron roughneck 165, the THM 160, the fingerboard 164, and/or the catwalk 161, among other examples. Each video camera 198 may generate a corresponding video signal (i.e., video feed) comprising or otherwise indicative of the captured video. The video cameras 198 may be in signal communication with the processing device 192, such as may permit the video signals to be processed and transmitted to the control workstation 197 and, thus, permit a wellsite operator 199 (e.g., the driller) to view various portions or components of the well construction system 100 on one or more of the output devices 196. The processing device 192 or another portion of the control workstation 197 may be operable to record the video signals generated by the video cameras 198.

Well construction systems within the scope of the present disclosure may include more or fewer components than as described above and depicted in FIG. 1. Additionally, various equipment and/or subsystems of the well construction system 100 shown in FIG. 1 may include more or fewer components than as described above and depicted in FIG. 1. For example, various engines, motors, hydraulics, actuators, valves, and/or other components not explicitly described herein may be included in the well construction system 100, and are within the scope of the present disclosure.

Figure 2:
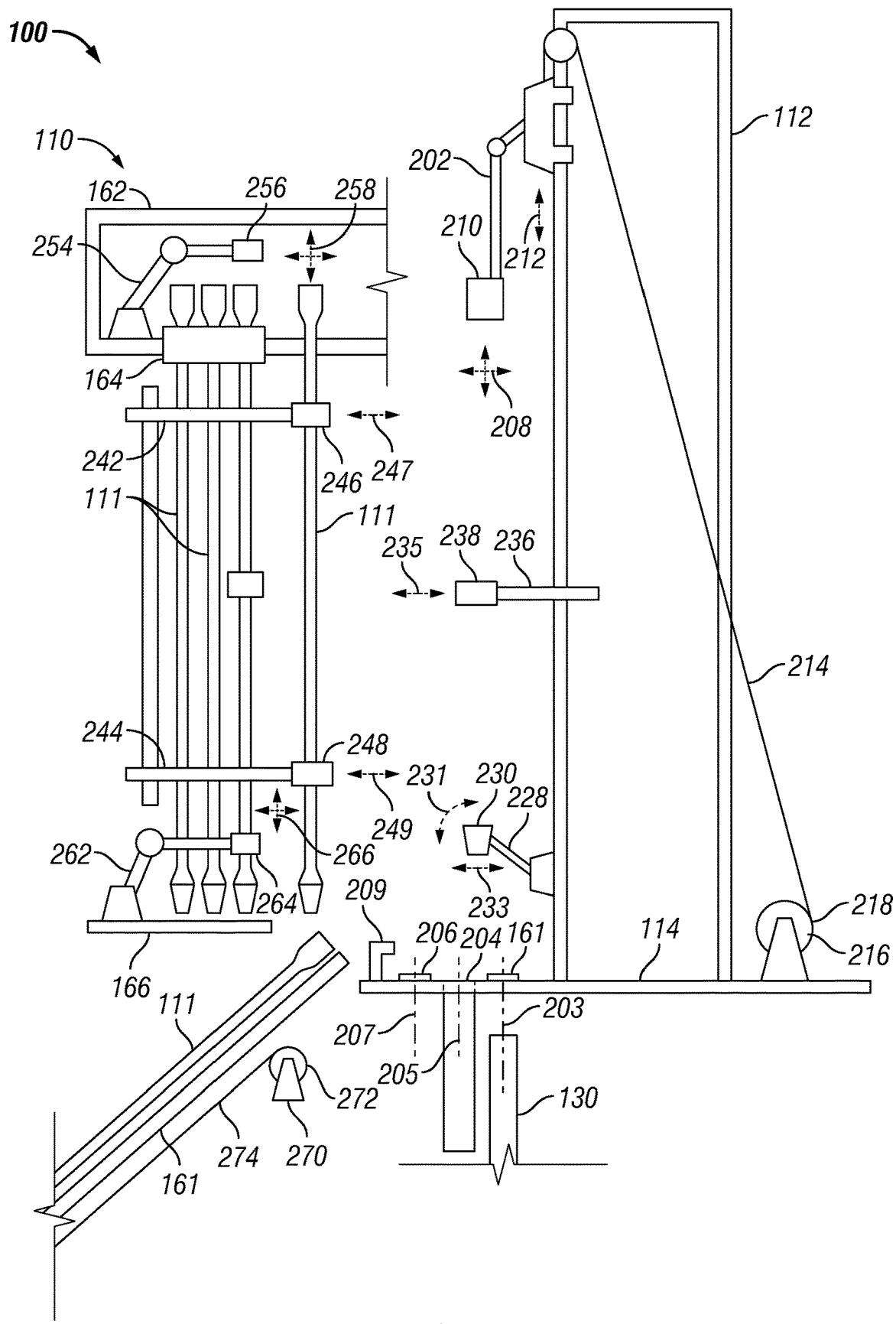
FIG. 2 is a schematic view of at least a portion of an example implementation of apparatus according to one or more aspects of the present disclosure.

FIG. 2 is another schematic view of at least a portion of the well construction system 100 shown in FIG. 1. FIG. 2 shows some of the surface equipment 110 shown in FIG. 1, including where indicated by the same reference numerals, and other surface equipment 110 of the well construction system 100. The surface equipment 110 shown in FIG. 2 includes various automated pipe handling equipment operable to transport tubulars 111 (e.g., drill pipes, stands of drill pipe, casing joints) between different areas of the well construction system 100 and to assemble and disassemble the drill string 120. The following description refers to FIGS. 1 and 2, collectively.

The support structure 112 or another portion of the well construction system 100 may support a tubular delivery arm (TDA) 202 operable to grab the tubulars 111, one at a time, from the fingerboard 164 and/or the catwalk 161 and lift or otherwise move the tubulars 111 to predetermined positions. For example, the TDA 202 may move a tubular 111 over the wellbore 102, such that the tubular 111 is aligned with the wellbore center 203 above the slips 161 and fluid control equipment 130 located below the drill floor 114. The TDA 202 may also move a tubular 111 over a mouse hole 204, such that the tubular 111 is aligned with the mouse hole center 205, permitting one or more tubulars 111 to be disposed therein such that two or more tubulars 111 can be coupled together to form a stand.

The TDA 202 may also move a tubular 111 to a doping stand or area 206, such that the tubular 111 may be prepared for make-up operations by a washer/doper device (doper) 209. For example the doper 209 may apply dope to pin ends of tubulars 111 in preparation for being made-up, and/or may wash the pin ends prior to the tubulars 111 being transfer to the fingerboard 164/setback 166. Accordingly, the doper 209 may be positioned in conjunction with the doping area 206, the mouse hole 204, and/or other areas, such as for performing the washing/doping operations on a tubular 111 while the tubular 111 is engaged by the TDA 202.

Portions of the TDA 202 may be operable to move horizontally and/or vertically, as indicated by arrows 208, such as may permit a grabber or clamp 210 of the TDA 202 to grab or otherwise receive a tubular 111 being transferred to the drill floor 114 by the catwalk 161. A drawworks 218 may be operable to move the TDA 202 vertically along the support structure 112, as indicated by arrows 212. The drawworks 218 may be operatively connected with the TDA 202 via a support line 214 extending between the TDA 202 and a drum 216 of the drawworks 218.

The support structure 112 or another portion of the well construction system 100 may further support a lower stabilization arm (LSA) 228 operable to receive (e.g., catch) and stabilize via a holding device 230 a tubular 111 supported by the TDA 202 after the tubular 111 is lifted off of the catwalk 161 and swings toward the support structure 112. The LSA 228 may then pivot 231 to horizontally move 233 the tubular 111 to align the tubular 111 with the mouse hole center 205 or the doping area 206. The holding device 230 may at least partially extend around the tubular 111 to provide additional stability, such as during stabbing prior to make-up operations.

The support structure 112 or another portion of the well construction system 100 may support the vertical pipe rack 162 comprising or supporting the fingerboard 164 defining a plurality of slots configured to support or otherwise hold the tubulars 111 within or above the setback 166 located adjacent to, along, of below the drill floor 114. The support structure 112, the vertical rack 162, or another portion of the well construction system 100, such as the THM 160, may support an upper tubular constraint (UTC) 242 and a lower tubular constraint (LTC) 244, each operable to grab a corresponding upper and lower portion of a tubular 111 via a corresponding grabber or clamp 246, 248. The UTC 242 and LTC 244 may stabilize the tubular 111 and/or horizontally move the corresponding upper and/or lower portions of the tubular 111, as indicated by arrows 247, 249, to align the tubular 111 with the mouse hole center 205 or the doping area 206. The UTC 242 and LTC 244 may also horizontally move the corresponding upper and/or lower portions of the tubular 111, as indicated by arrows 247, 249, to position the tubular 111 along a tubular handoff position 207, at which the TDA 202 can grab and then align the tubular 111 with the wellbore center 203 for connection with the drill string 120 or align the tubular 111 with a portion of the catwalk 161, permitting the tubular 111 to be lowered onto the catwalk 161. The catwalk 161 may then move the tubular 111 from the drill floor 114 to the ground level (e.g., the wellsite surface 104). The tubular handoff position 207 may be horizontally aligned with the doping area 206, such as may permit a tubular 111 to be doped and/or washed by the doper 209 before the TDA 202 aligns the tubular along the wellbore center 203 for connection with the drill string 120.

The support structure 112, the vertical rack 162, or another portion of the well construction system 100 may further support an intermediate tubular constraint (ITC) 236 operable to grab a tubular 111 supported by the TDA 202 via a grabber or clamp 238, stabilize the tubular 111, and/or horizontally move 235 the tubular 111 to align the tubular 111 with the mouse hole center 205 or the doping area 206.

The support structure 112, the vertical rack 162, or another portion of the well construction system 100 may further support a transfer bridge racker (TBR) 254 and a setback guide arm (SGA) 262 collectively operable to store (e.g., hang, rack) the tubulars 111 in the fingerboard 164 of the vertical rack 162 within or above the setback 166. For example, the TBR 254 may be operable to grab an upper portion of a tubular 111 via a grabber or clamp 256 and move the tubular 111 horizontally and/or vertically between the fingerboard 164 and the tubular handoff position 207, as indicated by arrows 258. The SGA 262 may be operable to grab a lower portion of the tubular 111 via a grabber or clamp 264 and guide the lower portion of the tubular 111 horizontally and/or vertically between the setback 166 and the tubular handoff position 207, as indicated by arrows 266, in unison (i.e., synchronously) with the TBR 254. When the tubular 111 is aligned with the tubular handoff position 207, the TDA 202 can grab and then align the tubular 111 with the wellbore center 203 for connection with the drill string 120 or align the tubular with a portion of the catwalk 161, permitting the tubular 111 to be lowered onto the catwalk 161.

The UTC 242, the ITC 236, and the LTC 244 may temporarily grasp a tubular 111 while in the tubular handoff position 207 and while the TBR 254, the SGA 262, and/or the TDA 202 are performing other operations. One or more of the UTC 242, the ITC 236, and the LTC 244 may also be extendable to grasp a tubular 111 in (or move the tubular 111 to) the mouse hole 204. For example, the tubular 111 may be temporarily stored in the mouse hole 204 while awaiting addition to the drill string 120 or while awaiting transfer to the tubular handoff position 207 and/or the fingerboard 164/setback 166.

The skate 163 of the catwalk 161 is movable along a groove (not shown) extending longitudinally along the catwalk 161. The skate 163 may be driven along the groove by a drive system 270, such as a winch system comprising a spool 272 driven by a motor (not shown). The drive system 270 may be selectively operable to pull the skate 163 in opposing directions along the catwalk 161 via a line 274 extending between the spool 272 and the skate 163. Actuated by the drive system 270, the skate 163 may be operable to convey (e.g., push) a tubular 111 along the catwalk 161 to the drill floor 114. The skate 163 may move the box end of the tubular 111 into the clamp 210 of the TDA 202, such that the tubular 111 can be lifted by the TDA 202.

The present disclosure is further directed to various implementations of systems and/or methods for providing, maintaining, and/or facilitating safety of personnel working or otherwise present at or on the drill floor. For example, the systems and/or methods according to one or more aspects of the present disclosure may detect when personnel are entering the drill floor and automatically change mode of operation of automated equipment on or near the drill floor from a normal or otherwise initial mode of operation to a safe or otherwise another mode of operation.

Figure 3:
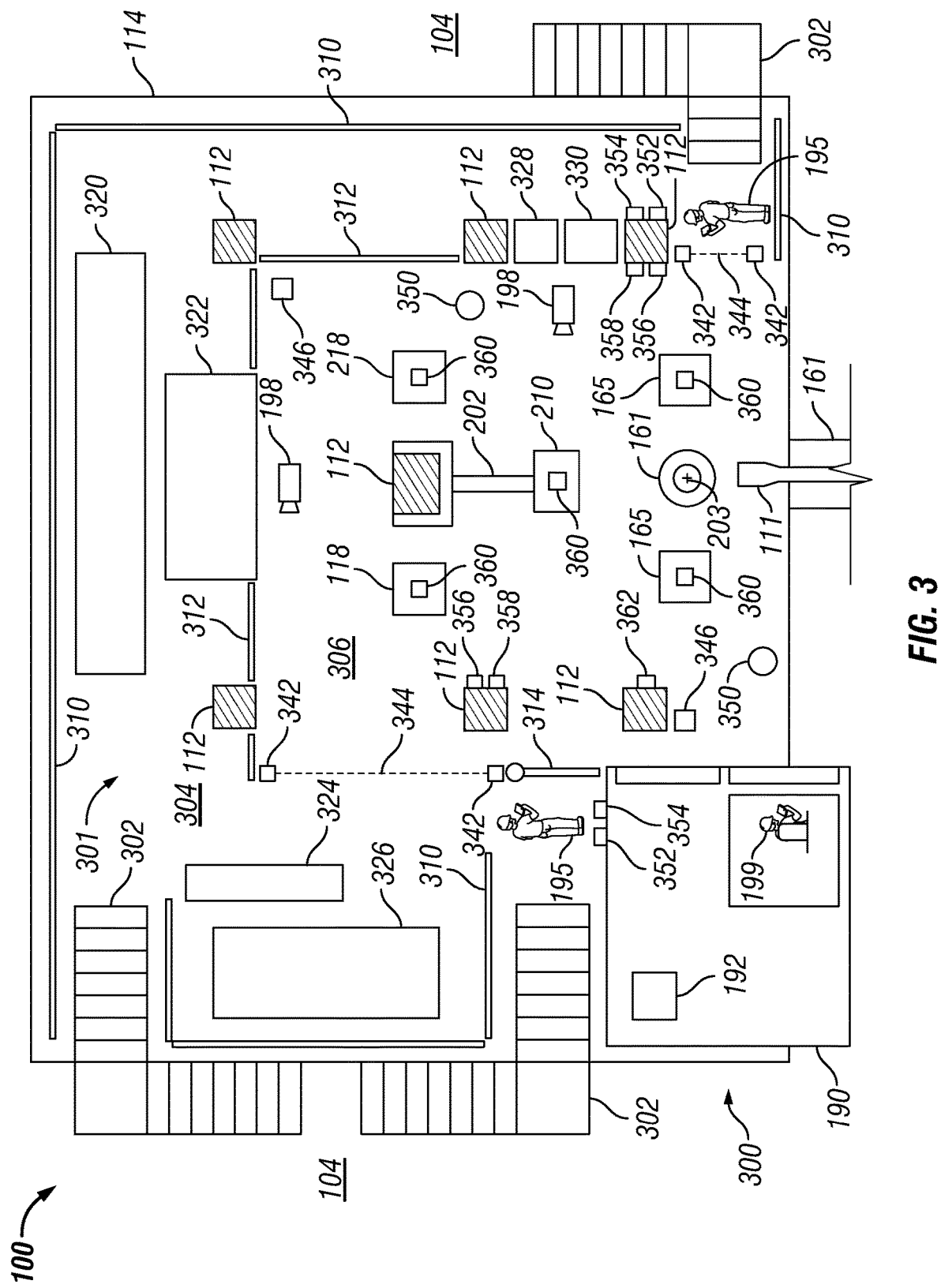
FIG. 3 is a schematic view of at least a portion of an example implementation of apparatus according to one or more aspects of the present disclosure.

FIG. 3 is an aerial schematic view of at least a portion of the well construction system 100 shown in FIGS. 1 and 2. FIG. 3 shows a monitoring and control system 300 for providing, maintaining, and/or facilitating safety of personnel working or otherwise present at or on the drill floor 114 during drilling operations. For example, the control system 300 may be operable to change mode of operation of drill floor equipment 301 between a normal mode of operation, during which wellsite operators 195 are not permitted to enter a predetermined area of the drill floor 114, and a safe mode of operation, during which operation and movement of the drill floor equipment 301 is limited and/or stopped and the wellsite operators 195 are permitted to enter the predetermined area of the drill floor 114. The following description refers to FIGS. 1-3, collectively.

FIG. 3 further shows several pieces of drill floor equipment 301 located on or above the drill floor 114 which may be monitored and controlled by the control system 300. The drill floor equipment 301 may comprise the drill floor equipment 109 shown in FIG. 1 and some of the tubular hoisting equipment shown in FIG. 3 that may operate at or close to the drill floor 114, including where indicated by the same reference numerals. However, it is to be understood that the drill floor 114 may contain other drill floor machinery or equipment 301 used during drilling operation that is not shown in FIG. 3, but are also within the scope of the present disclosure. The various portions of the control system 300 may be communicatively connected with the processing device 192 and/or one or more local controllers associated with one or more instances of the drill floor equipment 301, such as via a remote input/output (IO) unit or system strategically located on the drill floor 114.

The well construction system 100 may comprise one or more entry ways 302 (e.g., points of entry) which a wellsite operator 195 (e.g., drill floor worker, mechanic, maintenance personnel) can use to enter onto the drill floor 114. The entry ways 302 may comprise stairs, which may be utilized to reach the drill floor 114 from the wellsite surface 104 or another level of the well construction system 100. Safety barriers 310 (e.g., handrails, a fence, etc.) may outline portions of the drill floor 114 to permit the wellsite operators 195 to reach the drill floor equipment 301 and to prevent the wellsite operators 195 from accidentally falling off of the drill floor 114. The drill floor 114 may be divided into an unrestricted area 304, which contains drill floor equipment 301 that is relatively safe during drilling operations, and a restricted area 306, which contains drill floor equipment 301 that can pose a physical injury or are otherwise potentially dangerous during drilling operations. The unrestricted and restricted areas 304, 306 may be divided or otherwise defined by safety barriers 312 (e.g., handrails, a fence) located on the drill floor 114. The shape and definition of the unrestricted and restricted areas 304, 306 vary from rig to rig. The unrestricted area 304 may be entered via one or more of the entry ways 302 without restriction, permitting unrestricted access to the drill floor equipment 301 located at least partially within the unrestricted area 304. Entry by a wellsite operator 195 to the restricted area 306 may be limited by the safety barriers 312 and various sensors during drilling operations, such as to limit or prevent access to the drill floor equipment 301 located within the restricted area 306 to prevent physical injuries to wellsite operators 195 caused by such drill floor equipment 301 during drilling operations.

The unrestricted area 304 may encompass or contain at least a portion of the drill floor equipment 301, such as actuators 320 and/or transmissions 322 for the drawworks 118, 218, an electrical control panel 324 and other electrical equipment 326 for powering the drill floor equipment 301 and other electrical equipment of the well construction system 100, a deadline anchor 328, and a reel 330 for storing the support line 123, among other examples. The restricted area 306 may encompass or contain at least a portion of the drill floor equipment 301, such as the slips 161, the drawworks 118, 218, the iron roughnecks 165, and the catwalk 161, among other examples. The restricted area 306 may further include or encompass area or space above the drill floor 114 where other drill floor equipment 301 operates in, including, but not limited to, the top drive 116, the TDA 202, and the LSA 228.

A movable safety barrier 314 (e.g., a gate, a removable handrail) may physically separate a portion of the unrestricted and restricted areas 304, 306 and selectively permit a wellsite operator 195 to enter the restricted area 306 from the unrestricted area 304. The barrier 314 may be automated (e.g., remotely unlocked), permitting access to the restricted area 306 by the wellsite operator 199 (e.g., a driller) after the mode of operation of the drill floor equipment 301 is changed to the safe mode.

The control system 300 may comprise one or more presence detection sensors 342 installed on, above, or otherwise in association with the drill floor 114 to detect when a wellsite operator 195 enters the restricted area 306 of the drill floor 114, including via portions of the drill floor 114 that do not contain the safety barriers 312. Each presence detection sensor 342 may comprise one or more portions (e.g., units, components, pieces, etc.) operating collectively to detect when a wellsite operator 195 enters the restricted area 306. Each presence detection sensor 342 may comprise, generate, or define a presence detection space or area 344 (e.g., a virtual barrier), within which presence of a wellsite operator 195 can be detected. In other words, a presence detection sensor 342 may be triggered or operated when a wellsite operator 195 crosses or enters the presence detection area 344 to enter the restricted area 306 of the drill floor 114. The presence detection sensors 342 may be communicatively connected with the processing device 192 and/or a local controller associated with one or more instances of the drill floor equipment 301. When triggered or operated, a presence detection sensor 342 may output a presence detection signal or information to the processing device 192 and/or a local controller indicating that a wellsite operator 195 is entering or has entered the restricted area 306. The processing device 192 and/or the local controller may then cause the drill floor equipment 301 located within the restricted area 304 of the drill floor 114 to enter or change to the safe mode of operation.

An example presence detection sensor 342 may be or comprise a safety light curtain having a light sending unit operable to transmit light to a light receiving unit. If a wellsite operator 195 crosses and cuts off the light emitted by the light sending unit, one or more of the light sending and receiving units may output a presence detection signal or information to the processing device 192 and/or a local controller indicating that a wellsite operator 195 is entering or has entered the restricted area 306. Another example presence detection sensor 342 may be or comprise a rope pull switch (e.g., trip wire switch), comprising a rope (e.g., a rope, a chain, a wire, etc.) operatively connected with a switch sensor that can be triggered or operated when the rope is pulled. If a wellsite operator 195 pulls on the rope, the switch sensor may output a signal or information indicating that a wellsite operator 195 has entered the restricted area 306. Another example presence detection sensor 342 may be or comprise a mechanical arm (e.g., barrier) operatively connected to a position sensor that can be triggered or operated when the mechanical arm is moved (e.g., pushed, pulled). If a wellsite operator 195 pushes the mechanical arm, the position sensor may output a signal or information indicating that a wellsite operator 195 has entered the restricted area 306. Still another example presence detection sensor 342 may be or comprise a vibration sensor or a pressure sensor (e.g., pressure-sensitive safety mat) that can be triggered or operated when walked near or on by a wellsite operator 195. Thus, if a wellsite operator 195 walks by or on the vibration or pressure sensor, such sensor may output a signal or information indicating that a wellsite operator 195 has entered the restricted area 306.

The presence detection sensors 342 may also or instead be or comprise one or more of the video cameras 198 directed toward the drill floor 114. The video cameras 198 and the processing device 192 may utilize object recognition software to recognize wellsite operators 195 entering or present in the restricted area 306. Thus, if a wellsite operator 195 walks into the restricted area 306, the processing device 192 and/or the local controllers may then cause the drill floor equipment 301 located within the restricted area 304 of the drill floor 114 to enter or change to the safe mode of operation.

The presence detection sensors 342 may also or instead be or comprise one or more laser imaging, detection, and ranging (LIDAR) sensors 350 located on or above the drill floor 114 and communicatively connected with the processing device 192. The LIDAR sensors 350 and the processing device 192 may be collectively operable to map the 3D environment of the drill floor 114 in real time. The processing device 192 may be operable to receive and process the information output by the LIDAR sensors 350 and, based on the received information, determine position and movement of selected drill floor equipment 301 and of the wellsite operators 195, and change operation (e.g., stop or slow down) of selected drill floor equipment 301 to avoid collision with other drill floor equipment 301, structures (e.g., support structure 112), and/or the wellsite operators 195. The LIDAR sensors 350 may facilitate detection and determination of geometry and position of physical objects on the drill floor 114, such as the wellsite operators 195, the drill floor equipment 301, and unexpected objects, such as tools, drill bits, slips 161, among other examples. The processing device 192 may change (e.g., limit or stop) operation of the drill floor equipment 301 that is in vicinity of a wellsite operator 195 based on the information output by the LIDAR sensors 350 and other sensors associated with the drill floor equipment 301. The information output by the LIDAR sensors 350 may be used to generate movement limits for the drill floor equipment 301 to avoid collision with unknown objects whose positions are not already known. In more advanced implementations, multiple LIDAR sensors 350 may be used as part of a dynamic drill floor equipment control system that may permit the drill floor equipment 200 to move around a wellsite operator 195 without colliding or otherwise contacting the wellsite operator 195.

The drill floor 114 may include one or more sensors operable to detect position of the drill floor equipment 301, such as when it enters the restricted area 306 or another area of the drill floor 114. Such sensors may include a magnetic switch, a weight sensor, a proximity switch, and/or an optical sensor operable to communicate via wired or wireless means, among other examples.

The control system 300 may comprise one or more manually operated (i.e., actuated) presence confirmation sensors (or devices) 346 installed at one or more locations within the restricted area 306 of the drill floor 114, but away from or at a safe distance from the drill floor equipment 301 (e.g., outside area of travel of the drill floor equipment 301). The manually operated presence confirmation sensors 346 may be communicatively connected with the processing device 192 and/or local controllers. Each manually operated presence confirmation sensor 346 may mandate manual (i.e., physical) operation by a wellsite operator 195 to permit one or more of the drill floor equipment 301 located within the restricted area 306 to be operated. An implementation of a manually operated presence confirmation sensor 346 may mandate application of a sustained force to manually operate (i.e., activate) the presence confirmation sensor 346 to ensure that the wellsite operator 195 stays near the manually operated presence confirmation sensor 346 and out of the way of the drill floor equipment 301 located within the restricted area 306. When operated, a manually operated presence confirmation sensor 346 may output a presence confirmation signal or information to the processing device 192 and/or the local controller indicating that a wellsite operator 195 is operating the manually operated presence confirmation sensor 346. A manually operated presence confirmation sensor 346 may be or comprise a hand or foot operated pedal, switch, button, grip, or lever, among other examples.

Physical operation of a manually operated presence confirmation sensor 346 may cause the drill floor equipment 301 to enter or change to a different mode of operation, during which operation and movement of such drill floor equipment 301 is limited and/or stopped to increase safety. The physical characteristics of the manually operated presence confirmation sensor 346 may mandate that the wellsite operator 195 be physically located in a place on the drill floor 114 that is out of harm's way for at least some of the drill floor equipment 301. The location of the manually operated presence confirmation sensor 346 can be used to permit operation of some of the drill floor equipment 301 and to restrain, slow down, reduce range of motion of, or stop operation of other drill floor equipment 301. In some implementations, each manually operated presence confirmation sensor 346 may be associated with an adjacent safe area within the restricted area 306 of the drill floor 114, such that manual operation of the manually operated presence confirmation sensor 346 can at least partially limit (e.g., inhibit or stop) operation of selected drill floor equipment 301 located in close proximity to or within the adjacent safe area while other drill floor equipment 301 can operate without limitations. If two or more such manually operated presence confirmation sensors 346 are operated, each with a different (perhaps overlapping) adjacent safe areas, drill floor equipment 301 located in close proximity to or within the adjacent safe areas may be limited while other drill floor equipment may operate without limitations. The status of the manually operated presence confirmation sensors 346 can be continuously or nearly frequently monitored such that if a manually operated presence confirmation sensor 346 is released or otherwise not operated, the drill floor equipment 301 within the restricted area 306 may be caused to switch from limited operation to a full stop.

The control system 300 may further comprise restricted area entry and exit input devices 352, 354 located at or near the border of the restricted area 306. The entry and exit input devices 352, 354 may be located adjacent or near the entry ways 302 to the drill floor 114. The entry and exit input devices 352, 354 may be communicatively connected with the processing device 192 and/or local controllers of the drill floor equipment 301. The entry input device 352 may be operable to output an entry request signal when manually operated by the wellsite operator 195 intending to enter the restricted area 306, and the exit input device 354 may be operable to output an exit confirmation signal when manually operated (i.e., activated, actuated) by the wellsite operator 195 exiting the restricted area 306. Thus, manual operation of the entry device 352 may cause the drill floor equipment 301 to enter or change to the safe mode of operation. After the entry input device 352 is manually operated (e.g., touched, swiped, pressed) and the drill floor equipment 301 changes to the safe mode of operation, the safety barrier 314 may be automatically unlocked, opened, or permitted to be opened by the wellsite operator 195 to enter the restricted area 306. Manual operation of the exit input device 354 may cause the drill floor equipment 301 to enter or return to normal mode of operation, during which operation and movement of such drill floor equipment 301 is not limited. The entry and exit input devices 352, 354 may be or comprise push buttons, knobs, and levers, among other examples.

In some implementations, each of the entry and exit input devices 352, 354 may be or comprise a secured access device, such as a touch panel (for password access), a fingerprint scanner, a card reader, and/or a numeric keyboard (for passcode access). Such secured access devices may permit recordation or logging of the wellsite operators 195 initiating or changing the mode of operation of the drill floor equipment 301. Such secured access devices may permit initiation or changing of the mode of operation of the drill floor equipment 301 just by authorized personnel.

The control system 300 may further comprise drill floor warning lights 356, 358 within the restricted area 306 or another area of the drill floor 114. The warning lights 356, 358 may be communicatively connected with the processing device 192 and/or the local controllers of the drill floor equipment 301. The warning lights 356 (e.g., yellow lights) may be operated (e.g., turn on and/or flash), for example, when the drill floor equipment 301 operation and movement is limited and/or stopped. The warning lights 358 (e.g., red lights) may be operated when, for example, the drill floor equipment 301 operation and movement is not limited.

The control system 300 may also comprise drill floor equipment warning lights 360, each carried by or disposed in association with one or more instances of the drill floor equipment 301 located within the restricted area 306 or another area of the drill floor 114. The warning lights 360 may be communicatively connected with the processing device 192 and/or the local controllers of the drill floor equipment 301. The warning lights 360 may change color and/or flash based on and to indicate mode of operation of the drill floor equipment 301 carrying or otherwise associated with the drill floor equipment 301. For example, a red light may indicate that the piece of equipment 301 is active or powered (e.g., electrically, hydraulically, etc.), a flashing red light may indicate that the piece of equipment 301 is in motion, and a green light may indicate that the piece of equipment 301 is frozen or stopped (e.g., not powered).

The control system 300 may also comprise drill floor audio speakers 362 (e.g., a horn) within the restricted area 306 or another area of the drill floor 114. The speakers 360 may be communicatively connected with the processing device 192 and/or the local controllers of the drill floor equipment 301. The speakers 360 may be operated to output an audio signal when, for example, the drill floor equipment 301 changes between different modes of operation.

The drill floor equipment 301, including the drill floor equipment 301 within the restricted area 306, may operate in or change between different modes of operation based on actions and/or location of wellsite operators 195 on the drill floor 114. Similarly, the drill floor warning lights 356, 358, the drill floor equipment warning lights 360, and the drill floor speakers 362 may be operated based on the mode of operation of the drill floor equipment 301 and/or upon change of the mode of operation of the drill floor equipment 301.

For example, the drill floor equipment 301, such as the slips 161, the drawworks 118, 218, the iron roughnecks 165, the catwalk 161, the top drive 116, the TDA 202, and the LSA 228, may be set, entered, or switched to a "No Persons on Drill Floor" (NPDF) mode, in which operation and movement of such drill floor equipment 301 is not limited (i.e., operates normally). While the drill floor equipment 301 operates in the NPDF mode, the presence detection sensors 198, 342, 350, the manually operated presence confirmation sensors 346, and entry input devices 352 have not been operated (i.e., triggered, activated), at least one of the exit input devices 354 have been operated to confirm that no wellsite operator 195 is in the restricted area 306, the drill floor warning (e.g., red) lights 358 are energized, and the drill floor equipment lights 360 are operated to indicate that such equipment 301 is ready for operation (e.g., by emitting a steady red light) or operating (e.g., by emitting a flashing red light). The drill floor 114 enters the NPDF mode of operation when the various sensors 198, 342, 346, 350 indicate that no wellsite operators 195 are in the restricted area 306 of the drill floor 114. The presence detection sensors 198, 342, 350 are active and are ready to detect if someone enters the drill floor 114. Handrails 312 and gates 314 are also in place to prevent unauthorized entry. The audio speakers 362 may output an audio signal to indicate that the drill floor 114 is entering the NPDF mode of operation.

The drill floor equipment 301, such as the slips 161, the drawworks 118, 218, the iron roughnecks 165, the catwalk 161, the top drive 116, the TDA 202, and the LSA 228, may be set, entered, or switched to a "Persons on Drill Floor" (PDF) mode in which operation and movement of such drill floor equipment 301 is stopped, frozen, or otherwise rendered inert to mitigate or eliminate dangerous conditions. The PDF mode may be triggered or otherwise initiated when a wellsite operator 195 enters or attempts to enter the restricted area 306 of the drill floor 114. For example, the PDF mode may be initiated by a wellsite operator 195 operating an entry input device 352 to transmit an entry request signal, which may be indicated to the driller 199 via the control workstation 197 within the control center 190 or another output device. If the driller 199 permits entry to the wellsite operator 195, the driller 199 may initiate the PDF mode via the control workstation 197, causing the drill floor equipment 301 to undergo a controlled stop. The PDF mode may instead be automatically initiated when the wellsite operator 195 manually operates an entry input device 352. The PDF mode may be automatically initiated when a wellsite operator 195 enters the restricted area 306 without permission, such as by operating (i.e., activating, triggering) one or more of the presence detection sensors 342 configured to detect wellsite operators 195 entering the restricted area 306. The PDF mode may also or instead be automatically initiated when a wellsite operator 195 is detected by one or more of the video cameras 198 and/or the LIDAR 350. While the drill floor equipment 301 operates in the PDF mode, the drill floor warning (e.g., yellow) lights 356 may be energized and the drill floor equipment lights 360 may be operated to indicate that such equipment 301 is deactivated or otherwise not ready for operation (e.g., by emitting a steady green light). The audio speakers 362 may output an audio signal to indicate that the drill floor 114 is entering the PDF mode of operation.

The drill floor equipment 301, such as the slips 161, the drawworks 118, 218, the iron roughnecks 165, the catwalk 161, the top drive 116, the TDA 202, and the LSA 228, may be set, entered, or switched to a "Safe Operation Persons on Drill Floor" (SOPDF) mode in which operation and movement of such drill floor equipment 301 is permitted while a wellsite operator 195 is located within the restricted area 306 of the drill floor 114. The SOPDF mode may be triggered or otherwise initiated, for example, when a manually operated presence confirmation sensor 346 is operated (e.g., pressed and held in place). While in the SOPDF mode, operation and movement of selected drill floor equipment 301 may not be limited (i.e., operate normally), similarly as when operating in the NPDF mode. However, while in the SOPDF more, operation and movement of other selected drill floor equipment 301 may be reduced or otherwise limited, such as by activating (i.e., operating) some, but not all, of the drill floor equipment 301, and/or by operating some of the drill floor equipment 301 at a slower speed. While the drill floor equipment 301 operates in the SOPDF mode, the drill floor warning (e.g., red) lights 358 may be energized. The drill floor equipment lights 360 associated with activated drill floor equipment 301 may indicate that such equipment 301 is ready for operation (e.g., by emitting a steady red light) or is operating (e.g., by emitting a flashing red light), and the drill floor equipment lights 360 associated with deactivated drill floor equipment 301 may indicate that such equipment 301 is stopped or frozen (e.g., by emitting a steady green light). The audio speakers 362 may output an audio signal to indicate that the drill floor 114 is entering the SOPDF mode of operation. The manually operated presence confirmation sensors 346 may permit operation of the drill floor equipment 301 for or during a predefined time period, after which each instance drill floor equipment 301 in the restricted area 306 may be stopped.

While in the SOPDF mode, operation of the first iron roughneck 165 and its movement trolley (not shown), the second iron roughneck 165 and its movement arm (not shown), and the LSA 228 may be permitted from the control center 190 and via a handheld remote. An audio warning via the drill floor speakers 362 may be initiated prior to initiating equipment operations or travel to point of operation or home position. The audio warning may remain during equipment travel. The warning lights 358 may flash to indicate that the equipment is in motion. The drill floor equipment lights 360 may illuminate to show status of the equipment 301. For example, the lights 360 may illuminate red to indicate that the piece of equipment is active or powered (e.g., electrically, hydraulically, etc.), a flashing red light may indicate that the piece of equipment is in motion, and a green light may indicate that the piece of equipment is frozen or stopped (e.g., not powered). A safe height zone (e.g., three meters) may be initiated for the TDA 202 and the same rules may be applied to the TDA 202 as for the LSA 228, except the lights and audio signals will be initiated when the TDA 202 is below the safe height zone. Operation of the drawworks 118 and the top drive 116 may be permitted from the control center 190 and the speed of the drawworks 118 and the top drive 116 may be lowered (i.e., ramped down) when approaching drill floor 114, such as below the safe height zone.

When the wellsite operators 195 leave the restricted area 306 of the drill floor 114, the exit input device 354 may be operated to deactivate the PDF or SOPDF modes and initiate or permit initiation of the NPDF mode. Each exit input device 354 may comprise a "push and confirm" function and/or be equipped with an indication (e.g., red) light, which may start flashing after being pushed once and output a steady light when pushed again, indicating that NPDF is being initiated or can be initiated by the driller 199. When the NPDF mode of operation is initiated, the warning (e.g., red) lights 358 on the drill floor 114 may be energized and information output to the driller 199 via the control workstation 197 to indicate that the NPDF mode is initiated.

When a wellsite operator 195 is about to enter the restricted area 306 of the drill floor 114, the entry input device 352 may be operated to initiate the PDF mode. Each entry input device 352 be equipped with an indication (e.g., yellow) light, which may be activated after the entry input device 352 is manually operated, indicating that the PDF mode is being initiated. When the PDF mode of operation is initiated, the warning (e.g., yellow) lights 356 on the drill floor 114 may be energized and information output to the driller 199 via the control workstation 197 to indicate that the PDF mode is initiated. When the PDF mode is initiated via the entry input device 352, the drill floor equipment 301 may undergo a controlled stop during a ramp down period to reduce impact of the drill floor equipment 301. The lights 356 and the entry input device 352 may flash during the ramp-down period and become steady after the drill floor equipment 301 comes to full stop. However, when the PDF mode is initiated via operation of the presence detection sensors 198, 342, 350, the drill floor equipment 301 may stop or freeze immediately, without a ramp-down period.

While in the PDF mode of operation, the first iron roughneck 165 and its movement trolley may be frozen in their current travel position and their movement along (e.g., in and out) the drill floor 114 may be inhibited. Height adjustment and make up/break out cycle may be permitted. Operation of the first iron roughneck 165 and its movement trolley via a handheld remote may be permitted. It is then assumed that the wellsite operator 195 operating the first iron roughneck 165 and its movement trolley is working on the drill floor 114. Same limitations may be applied to the second iron roughneck 165 and its movement arm. The LSA 228 may be frozen in its current travel position and movement along (e.g., in and out) the drill floor 114 may be inhibited. A safe height zone (e.g., three meters) may be initiated for the TDA 202, wherein the TDA 202 will stop before entering the safe height zone and wait for a PTA to be pushed. Operation of the TDA 202 via a handheld remote may be permitted. It is then assumed that the wellsite operator 195 operating the TDA 202 is working on the drill floor 114. The speed of the drawworks 118 and the top drive 116 may be lowered (i.e., ramped down) when approaching drill floor 114, such as below the safe height zone.

The control system 300 may be utilized to implement safety procedures or methods for entering, working, and exiting the drill floor 114. For example, when a wellsite operator 195 intends to work in the restricted area 306 of the drill floor 114, the wellsite operator 195 may operate (e.g., push) an entry input device 352, which may then transmit an entry request to the driller 199 or other authority for the rig site. In other implementations this can be done via other communication mechanisms, such as email, text, or telephone. An indicator light associated with the entry input device 352 or another light can start flashing to provide a visual cue to other wellsite operators 195 in the area that the request has been sent. The driller 199 can approve or deny the entry request. If denied, the control system 300 can return to the mode it was in before the request was made and the wellsite operator 195 who made the request can be denied entry to the restricted area 306. If the request is approved, the drill floor warning lights 356 may start flashing to indicate that the transition process has started. The drill floor equipment 301 may then ramp down and stop. The drill floor equipment lights 360 may then light green. The flashing indicator light associated with the entry input device 352 and the flashing drill floor warning lights 356 may become steady to indicate that the drill floor equipment 301 has stopped operating. While in the PDF mode, the driller 199 is prevented from operating machinery in the restricted area 306. In some implementations, other wellsite operators 195 or equipment that may be in a position to issue commands to the drill floor equipment 301 is suspended to ensure that the drill floor equipment 301 is not operated while a wellsite operator 195 is in a potentially dangerous position on the drill floor 114.

In some implementations triggering or operating a presence detection sensor 342 (e.g., crossing a light curtain, pulling a rope of a rope pull switch, stepping on a pressure mat, etc.), crossing the barriers 312, or triggering other presence detection sensors 198, 350 may cause the drill floor equipment 301 to stop immediately with no ramp-down period. Ramp-down operation dictates that some equipment 301 is brought to a halt over a period of time for improved efficiency or to safeguard the equipment 301. These ramp-down procedures can be circumvented if the presence detection sensors 198, 342, 350 detect that a wellsite operator 195 has crossed a barrier 312. After each piece of equipment 301 has reached its shut-down state, the drill floor 114 and the equipment 301 is in the PDF mode of operation, in which there are wellsite operators 195 on the drill floor.

The control system 300 may be utilized to implement other safety procedures or methods for entering, working, and exiting the drill floor 114. For example, when a wellsite operator 195 intends to remain in the restricted area 306 of the drill floor 114 while one or more pieces of the drill floor equipment 301 is operating. Some of the drill floor equipment 301 may be halted or slowed to prevent a dangerous situation. However, work can still be performed if proper safety measures are carried out. Thus, a wellsite operator 195 may manually operate a manually operated presence confirmation sensor 346, which can be a "push-and-hold" button. The control system 300 can then switch the drill floor equipment 301 mode of operation to permit single-machine operation from the driller 199. Radio remote control operation can be permitted, and some of the drill floor equipment 301 can be operated in a limited state, such as at a limited speed and/or range of operation. Thus, after manually operated presence confirmation sensor 346 is operated, the control system 300 may enter the SOPDF mode of operation. In such mode of operation, the wellsite operator 195 can select the piece of drill floor equipment 301 to operate. Red warning lights 364 for the activated and operating drill for equipment 301 may be initiated, pre-warning audio alarms can be sounded, and the selected drill floor equipment 301 can be started and used either fully or in a limited mode.

The control system 300 may be utilized to implement still other safety procedures or methods for entering, working, and exiting the drill floor 114. For example, when a wellsite operator 195 intends to exit the restricted area 306 of the drill floor 114, the PDF or SOPDF modes of operation may be transitioned to the NPDF mode of operation. Before exiting the restricted area 306 of the drill floor 114, the wellsite operator 195 is mandated to visually check the restricted area 306 to make sure that no other personnel are located in the restricted area 306. This can be achieved using sensors such as optical sensors or other suitable sensors. In addition, the manually operated presence confirmation sensors 346 that mandate sustained activation can be assessed. An active manually operated presence confirmation sensor 346 may indicate that other wellsite operators 195 may still be present in the restricted area 306. In some implementations, identifying that each manually operated presence confirmation sensor 346 is depressed may be a mandated condition, but not a sufficient condition for reaching a conclusion that no wellsite operators 195 are present in the restricted area 306. After sufficient confidence that there are no personnel in the restricted area 306 has been reached, an exit input device 354 may be manually operated, causing the light associated with the exit input device 354 to be turned off and the drill floor equipment 301 to be readied for warm-up or use. After each piece of drill floor equipment 301 is ready and warnings lights and alarms are set to their appropriate state, the NPDF mode of operation is achieved, at which time the drill floor equipment 301 can be used without limitation.

Figure 4:
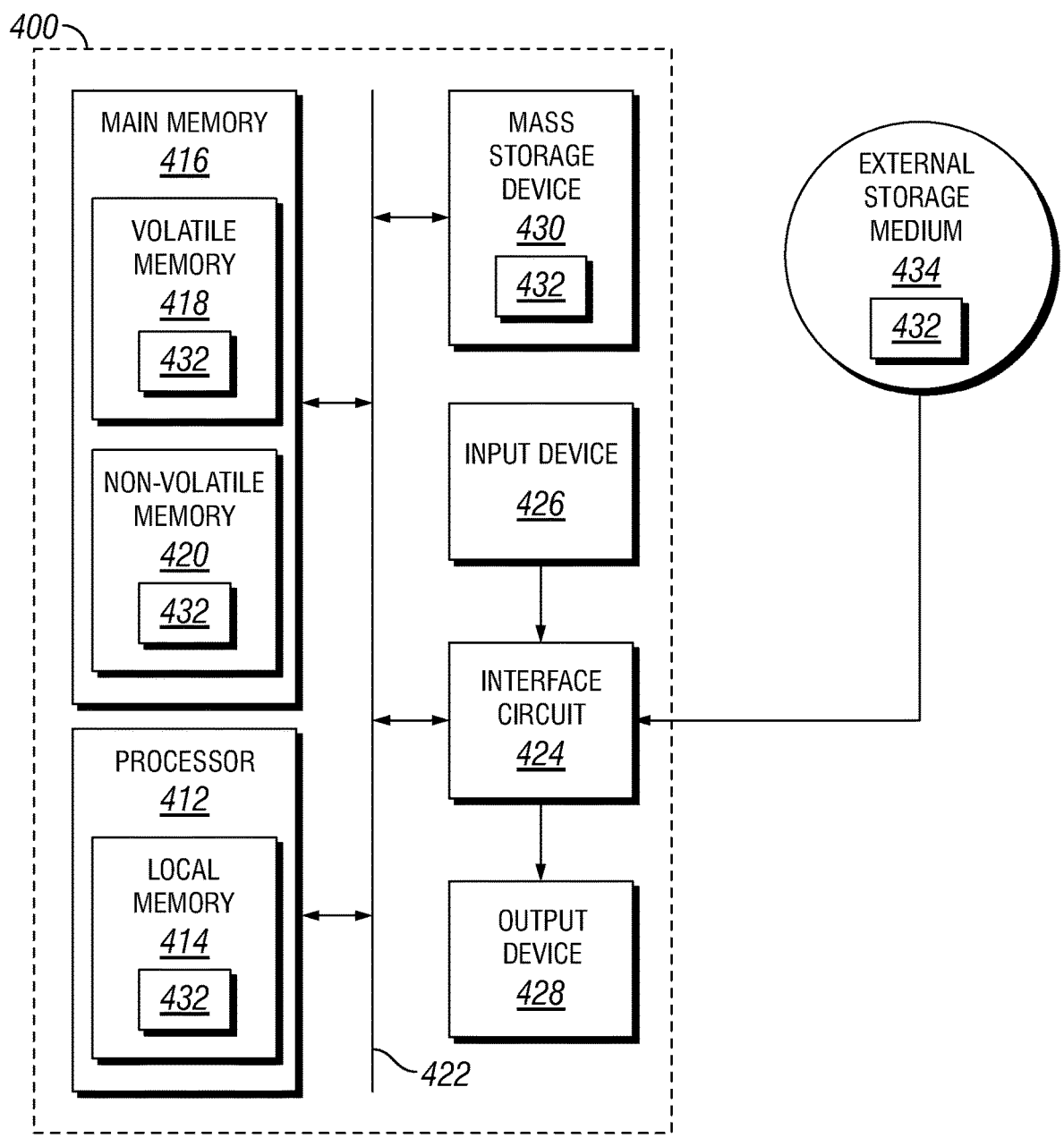
FIG. 4 is a schematic view of at least a portion of an example implementation of apparatus according to one or more aspects of the present disclosure.

FIG. 4 is a schematic view of at least a portion of an example implementation of a processing system 400 (or device) according to one or more aspects of the present disclosure. The processing system 400 may be or form at least a portion of one or more processing devices, equipment controllers, and/or other electronic devices shown in one or more of the FIGS. 1-3. Accordingly, the following description refers to FIGS. 1-4, collectively.

The processing system 400 may be or comprise, for example, one or more processors, controllers, special-purpose computing devices, PCs (e.g., desktop, laptop, and/or tablet computers), personal digital assistants, smartphones, IPCs, PLCs, servers, internet appliances, and/or other types of computing devices. The processing system 400 may be or form at least a portion of the processing devices 192 shown in FIGS. 1 and 3, and local controllers associated with one or more instances of the drill floor equipment 301. Although it is possible that the entirety of the processing system 400 is implemented within one device, it is also contemplated that one or more components or functions of the processing system 400 may be implemented across multiple devices, some or an entirety of which may be at the wellsite and/or remote from the wellsite.

The processing system 400 may comprise a processor 412, such as a general-purpose programmable processor. The processor 412 may comprise a local memory 414, and may execute machine-readable and executable program code instructions 432 (i.e., computer program code) present in the local memory 414 and/or another memory device. The processor 412 may execute, among other things, the program code instructions 432 and/or other instructions and/or programs to implement the example methods, processes, and/or operations described herein. For example, the program code instructions 432, when executed by the processor 412 of the processing system 400, may cause the drill floor equipment 301 to perform example methods and/or operations described herein. The program code instructions 432, when executed by the processor 412 of the processing system 400, may also or instead cause the processor 412 to receive and process sensor data (e.g., sensor measurements), and output control commands to the drill floor equipment 301 based on predetermined set-points and the received sensor data.

The processor 412 may be, comprise, or be implemented by one or more processors of various types suitable to the local application environment, and may include one or more of general-purpose computers, special-purpose computers, microprocessors, digital signal processors (DSPs), field-programmable gate arrays (FPGAs), application-specific integrated circuits (ASICs), and processors based on a multi-core processor architecture, as non-limiting examples. Examples of the processor 412 include one or more INTEL microprocessors, microcontrollers from the ARM and/or PICO families of microcontrollers, embedded soft/hard processors in one or more FPGAs.

The processor 412 may be in communication with a main memory 416, such as may include a volatile memory 418 and a non-volatile memory 420, perhaps via a bus 422 and/or other communication means. The volatile memory 418 may be, comprise, or be implemented by random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 420 may be, comprise, or be implemented by read-only memory, flash memory, and/or other types of memory devices. One or more memory controllers (not shown) may control access to the volatile memory 418 and/or non-volatile memory 420.

The processing system 400 may also comprise an interface circuit 424, which is in communication with the processor 412, such as via the bus 422. The interface circuit 424 may be, comprise, or be implemented by various types of standard interfaces, such as an Ethernet interface, a universal serial bus (USB), a third generation input/output (3GIO) interface, a wireless interface, a cellular interface, and/or a satellite interface, among others. The interface circuit 424 may comprise a graphics driver card. The interface circuit 424 may comprise a communication device, such as a modem or network interface card to facilitate exchange of data with external computing devices via a network (e.g., Ethernet connection, digital subscriber line (DSL), telephone line, coaxial cable, cellular telephone system, satellite, etc.).

The processing system 400 may be in communication with various sensors, video cameras, actuators, processing devices, equipment controllers, and other devices of the well construction system via the interface circuit 424. The interface circuit 424 can facilitate communications between the processing system 400 and one or more devices by utilizing one or more communication protocols, such as an Ethernet-based network protocol (such as ProfiNET, OPC, OPC/UA, Modbus TCP/IP, EtherCAT, UDP multicast, Siemens S7 communication, or the like), a proprietary communication protocol, and/or another communication protocol.

One or more input devices 426 may also be connected to the interface circuit 424. The input devices 426 may permit human wellsite operators 195 to enter the program code instructions 432, which may be or comprise control commands, operational parameters, operational thresholds, and/or other operational set-points. The program code instructions 432 may further comprise modeling or predictive routines, equations, algorithms, processes, applications, and/or other programs operable to perform example methods and/or operations described herein. The input devices 426 may be, comprise, or be implemented by a keyboard, a mouse, a joystick, a touchscreen, a track-pad, a trackball, an isopoint, and/or a voice recognition system, among other examples. One or more output devices 428 may also be connected to the interface circuit 424. The output devices 428 may permit for visualization or other sensory perception of various data, such as sensor data, status data, and/or other example data. The output devices 428 may be, comprise, or be implemented by video output devices (e.g., an LCD, an LED display, a CRT display, a touchscreen, etc.), printers, and/or speakers, among other examples. The one or more input devices 426 and the one or more output devices 428 connected to the interface circuit 424 may, at least in part, facilitate the HMIs described herein.

The processing system 400 may comprise a mass storage device 430 for storing data and program code instructions 432. The mass storage device 430 may be connected to the processor 412, such as via the bus 422. The mass storage device 430 may be or comprise a tangible, non-transitory storage medium, such as a floppy disk drive, a hard disk drive, a compact disk (CD) drive, and/or digital versatile disk (DVD) drive, among other examples. The processing system 400 may be communicatively connected with an external storage medium 434 via the interface circuit 424. The external storage medium 434 may be or comprise a removable storage medium (e.g., a CD or DVD), such as may be operable to store data and program code instructions 432.

As described above, the program code instructions 432 and other data (e.g., sensor data or measurements database) may be stored in the mass storage device 430, the main memory 416, the local memory 414, and/or the removable storage medium 434. Thus, the processing system 400 may be implemented in accordance with hardware (perhaps implemented in one or more chips including an integrated circuit, such as an ASIC), or may be implemented as software or firmware for execution by the processor 412. In the case of firmware or software, the implementation may be provided as a computer program product including a non-transitory, computer-readable medium or storage structure embodying computer program code instructions 432 (i.e., software or firmware) thereon for execution by the processor 412. The program code instructions 432 may include program instructions or computer program code that, when executed by the processor 412, may perform and/or cause performance of example methods, processes, and/or operations described herein.

The present disclosure is further directed to an example monitoring and control system 300 for maintaining safety of a human worker 195 in a restricted area 306 of a drill floor 114 during drilling operations performed at least partially by automated drill floor equipment 301 located in the restricted area 306. The control system 300 may be located at, installed on, or otherwise form at least a portion of the well construction system 100 shown in FIGS. 1-3. The control system 300 may comprise a processing device, such as the processing device 400 shown in FIG. 4. Accordingly, the following description refers to FIGS. 1-4, collectively.

The control system 300 may comprise a plurality of presence detection sensors 198, 342, 350, each disposed on the drill floor 114 and operable to output a presence detection signal indicative of detection of the human worker 195 entering the restricted area 306, and an entry input device 352 disposed on the drill floor 114 and operable to output an entry request signal when manually operated by the human worker 195 intending to enter the restricted area 306. The control system 300 may further comprise a processing device 400 (which may be or comprise the processing device 192 or a local controller associated with a corresponding piece of equipment 301) comprising a processor 412 and a memory 416 storing computer program code 432. The processing device 400 may be communicatively connected with the equipment 301, the presence detection sensors 198, 342, 350, and the entry input device 352. The processing device 400 may be operable to receive the presence detection signal, output a first stop control command to the equipment 301 to cause the equipment 301 to stop operating in response to the received presence detection signal. The processing device 400 may be further operable to receive the entry request signal, output an entry request indicator via an output device 196 to a human driller 199 within a drill rig control center 190 in response to the received entry request signal, receive an entry grant input from the human driller 199 granting entry to the human worker 195 to enter the restricted area 306, and output a second stop control command to the equipment 301 located in the restricted area 306 to cause the equipment 301 to stop operating in response to the received entry grant input. Before outputting the first and/or second stop control commands, the processing device 400 may cause the equipment 301 (or the drill floor 114) to operate in the NPDF mode of operation. Upon outputting the first and/or second stop control commands, the processing device 400 may cause the equipment 301 (or the drill floor 114) to enter the PDF mode of operation. The drill floor equipment 301 may be or comprise at least one of drill string slips 161, a drawworks 118, 218, an iron roughneck 165, a catwalk 161, a top drive 116, a TDA 202, and an LSA 228.

Each presence detection sensor 342 may be or comprise a light curtain and/or a rope pull switch, and the entry input device 352 may be or comprise a push button. The entry request indicator may be or comprise a visual indicator output via at least one of a light emitting device and a video output device, and/or the entry request indicator may be or comprise an audio indicator output via an audio speaker.

The processing device 400 may be further operable to output a third stop control command to the equipment 301 located in the restricted area 306 to cause the equipment 306 to stop operating in response to the received entry request signal output by the exit input device 354. Upon outputting the third stop control command, the processing device 400 may cause the equipment 301 (or the drill floor 114) to enter the PDF mode of operation. Furthermore, the first stop control command may cause the equipment 301 to stop operating immediately, and the second and third stop control commands may cause the equipment 301 to ramp-down operations before the equipment stops operating.

The control system 300 may further comprise an exit input device 354 disposed on the drill floor 114 and operable to output an exit confirmation signal when manually operated by the human worker 195 exiting the restricted area 306. The processing device 400 may be communicatively connected with the exit input device 354. The processing device 400 may be further operable to receive the exit confirmation signal and output a start control command to the equipment 301 located in the restricted area 306 to cause the equipment 306 to start operating in response to the received exit confirmation signal. Upon outputting the start control command, the processing device 400 may cause the equipment 301 (or the drill floor 114) to enter the NPDF mode of operation.

The system may further comprise a manually operated presence confirmation sensor 346 disposed in the restricted area 306 away from a path of movement (hereafter "movement path") of the equipment 301 and operable to output a presence confirmation signal when manually operated by the human worker 195 in the restricted area 306. The processing device 400 may be communicatively connected with the manually operated presence confirmation sensor 346. The processing device 400 may be further operable to receive the presence confirmation signal, output limited operation control commands to the equipment 301 located in the restricted area 306 to cause the equipment 301 to start operating in a limited manner while the presence confirmation signal is being received, and output a fourth stop control command to the equipment 301 to cause the equipment 301 to stop operating when the presence confirmation signal is no longer being received. The limited operation control commands may cause a predetermined one or more instances, but not each instance, of the equipment 301 to operate. The limited operation control commands may also or instead cause a predetermined one or more instances of the equipment 301 to operate at a reduced speed of operation. The manually operated presence confirmation sensor 346 may be or comprise at least one of a foot pedal and a push button. Upon outputting the limited operation control commands, the processing device 400 may cause the equipment 301 (or the drill floor 114) to enter the SOPDF mode of operation, and upon outputting the fourth stop control command, the processing device 400 may cause the equipment 301 (or the drill floor 114) to enter the PDF mode of operation.

The control system 300 may further comprise a plurality of red lights 358 disposed on the drill floor 114, and a plurality of yellow lights 356 disposed on the drill floor 114. The processing device 400 may be communicatively connected with the red lights 358 and the yellow lights 356. The processing device 400 may be further operable to cause the red lights 358 to light up when the equipment 301 is operating, and cause the yellow lights 356 to light up in response to receiving at least one of the presence detection signal and the received entry grant input.

The present disclosure is further directed to example operations, processes, and/or methods for switching between the different modes of operation of the drill floor equipment 301, such as by entering and exiting the restricted area 306 of the drill floor 114 according to one or more aspects of the present disclosure. The example methods may be performed utilizing or otherwise in conjunction with at least a portion of one or more implementations of one or more instances of the apparatus shown in one or more of FIGS. 1-4, and/or otherwise within the scope of the present disclosure. For example, the methods may be performed and/or caused, at least partially, by a processing device, such as the processing device 400 executing program code instructions 432 according to one or more aspects of the present disclosure. Thus, the present disclosure is also directed to a non-transitory, computer-readable medium comprising computer program code that, when executed by the processing device, may cause such processing device to perform the example methods described herein. The methods may also or instead be performed and/or caused, at least partially, by a human wellsite operator 195, 199 utilizing one or more instances of the apparatus shown in one or more of FIGS. 1-4, and/or otherwise within the scope of the present disclosure. Thus, the following description of an example method refers to apparatus shown in one or more of FIGS. 1-4. However, the method may also be performed in conjunction with implementations of apparatus other than those depicted in FIGS. 1-4 that are also within the scope of the present disclosure.

A method may comprise commencing operation of a processing device 400 to operate a control system 300 for maintaining safety of a human worker 195 in a restricted area 306 of a drill floor 114 during drilling operations performed at least partially by equipment 301 located in the restricted area 306. The processing device 400 may receive a presence detection signal indicative of detection of the human worker 195 entering the restricted area 306 and output a first stop control command to the equipment 301 to cause the equipment 301 to stop operating in response to the received presence detection signal. The processing device 400 may receive an entry request signal indicative of intent of the human worker 195 to enter the restricted area 306, output an entry request indicator via an output device 196 to a human driller 199 within a drill rig control center 190 in response to the received entry request signal, receive an entry grant input from the human driller 199 granting entry to the human worker 195 to enter the restricted area 306, and output a second stop control command to the equipment 301 located in the restricted area 306 to cause the equipment 301 to stop operating in response to the received entry grant input. The first stop control command may cause the equipment 301 to stop operating immediately, and wherein the second stop control command may cause the equipment 301 to ramp-down operations before the equipment 301 stops operating. The processing device 400 may further output a third stop control command to the equipment 301 located in the restricted area 306 to cause the equipment 301 to stop operating in response to the received entry request signal. The processing device 400 may further cause red lights 358 to light up when the equipment 301 is operating, and cause yellow lights 356 to light up in response to receiving at least one of the presence detection signal and the received entry grant input.

The equipment 301 may comprise at least one of drill string slips 161, a drawworks 118, 218, an iron roughneck 165, a catwalk 161, a top drive 116, a TDA 202, and an LSA 228. The presence detection signal may be received from a presence detection sensor 198, 342, 350 disposed on the drill floor 114 upon detection of a human worker 195 entering the restricted area 306. The presence detection sensor 342, may be or comprise a light curtain and/or a rope pull switch. The entry request signal may be received from an entry input device 352 disposed on the drill floor 114 upon being manually operated by the human worker 195 intending to enter the restricted area 306. The entry input device 352 may be or comprise a push button. The entry request indicator may be or comprise a visual indicator output via at least one of a light emitting device 196 and a video output device 196, and/or an audio indicator output via an audio speaker.

The processing device 400 may further receive an exit confirmation signal from an exit input device 354 upon being manually operated by the human worker 195 exiting the restricted area 306, and output a start control command to the equipment 301 located in the restricted area 306 to cause the equipment 301 to start operating in response to the received exit confirmation signal.

The processing device 400 may further receive a presence confirmation signal from a manually operated presence confirmation sensor 346 disposed in the restricted area 306 away from a movement path of the equipment 301 upon being manually operated by the human worker 195 in the restricted area 306, output limited operation control commands to the equipment 301 located in the restricted area 306 to cause the equipment 301 to start operating in a limited manner while the presence confirmation signal is being received, and output a fourth stop control command to the equipment 301 to cause the equipment 301 to stop operating when the presence confirmation signal is no longer being received. The manually operated presence confirmation sensor 346 may be or comprise at least one of a foot pedal and a push button.

In view of the entirety of the present disclosure, including the figures and the claims, a person having ordinary skill in the art will readily recognize that the present disclosure introduces an apparatus comprising a system for maintaining safety of a human worker in a restricted area of a drill floor during drilling operations performed at least partially by equipment located in the restricted area, wherein the system comprises: a plurality of presence detection sensors each disposed on the drill floor and operable to output a presence detection signal indicative of detection of the human worker entering the restricted area; an entry input device disposed on the drill floor and operable to output an entry request signal when manually operated by the human worker intending to enter the restricted area; and a processing device comprising a processor and a memory storing computer program code, wherein the processing device is communicatively connected with the equipment, the presence detection sensors, and the entry input device. The processing device is operable to: receive the presence detection signal; output a first stop control command to the equipment to cause the equipment to stop operating in response to the received presence detection signal; receive the entry request signal; output an entry request indicator via an output device to a human driller within a drill rig control center in response to the received entry request signal; receive an entry grant input from the human driller granting entry to the human worker to enter the restricted area; and output a second stop control command to the equipment located in the restricted area to cause the equipment to stop operating in response to the received entry grant input.

The system may comprise an exit input device disposed on the drill floor and operable to output an exit confirmation signal when manually operated by the human worker exiting the restricted area. In such implementations, among others within the scope of the present disclosure, the processing device may be communicatively connected with the exit input device, and the processing device may be operable to receive the exit confirmation signal and output a start control command to the equipment located in the restricted area to cause the equipment to start operating in response to the received exit confirmation signal.

The system may comprise a manually operated presence confirmation sensor disposed in the restricted area away from a movement path of the equipment and operable to output a presence confirmation signal when manually operated by the human worker in the restricted area. In such implementations, among others within the scope of the present disclosure, the processing device may be communicatively connected with the manually operated presence confirmation sensor, and the processing device may be operable to receive the presence confirmation signal, output limited operation control commands to the equipment located in the restricted area to cause the equipment to start operating in a limited manner while the presence confirmation signal is being received, and output a third stop control command to the equipment to cause the equipment to stop operating when the presence confirmation signal is no longer being received. The manually operated presence confirmation sensor may be or comprise at least one of a foot pedal and a push button.

The processing device may be operable to output a third stop control command to the equipment located in the restricted area to cause the equipment to stop operating in response to the received entry request signal.

The first stop control command may cause the equipment to stop operating immediately, and the second stop control command may cause the equipment to ramp-down operations before the equipment stops operating.

The equipment may be or comprise at least one of drill string slips, a drawworks, an iron roughneck, a catwalk, a top drive, a tubular delivery arm, and a lower stabilization arm.

At least one of the presence detection sensors may be or comprise a light curtain.

At least one of the presence detection sensors may be or comprise a rope pull switch.

The entry input device may be or comprise a push button.

The entry request indicator may be or comprise a visual indicator output via at least one of a light emitting device and a video output device and/or an audio indicator output via an audio speaker.

The system may comprise a plurality of red lights and a plurality of yellow lights disposed on the drill floor, the processing device may be communicatively connected with the red and yellow lights, and the processing device may be operable to cause the red lights to light up when the equipment is operating and cause the yellow lights to light up in response to receiving at least one of the presence detection signal and the received entry grant input.

The present disclosure also introduces an apparatus comprising a system for maintaining safety of a human worker in a restricted area of a drill floor during drilling operations performed at least partially by equipment located in the restricted area, wherein the system comprises: a manually operated presence confirmation sensor disposed in the restricted area away from a movement path of the equipment and operable to output a presence confirmation signal when manually operated by the human worker in the restricted area; and a processing device comprising a processor and a memory storing computer program code, wherein the processing device is communicatively connected with the equipment and the manually operated presence confirmation sensor. The processing device is operable to receive the presence confirmation signal and to output limited operation control commands to the equipment located in the restricted area to cause the equipment to start operating in a limited manner in response to the received presence confirmation signal.

The limited operation control commands may cause a predetermined one or more instances, but not each instance, of the equipment to operate.

The limited operation control commands may cause a predetermined one or more instances of the equipment to operate at a reduced speed of operation.

The processing device may be operable to output the limited operation control commands to the equipment while the presence confirmation signal is being received, and to output a stop control command to the equipment to cause the equipment to stop operating when the presence confirmation signal is no longer being received.

The manually operated presence confirmation sensor may be or comprise at least one of a foot pedal and a push button.

The system may comprise an entry input device disposed on the drill floor and operable to output an entry request signal when manually operated by the human worker intending to enter the restricted area. The processing device may be communicatively connected with the entry input device, and may be operable to receive the entry request signal, output an entry request indicator via an output device to a human driller within a drill rig control center in response to the received entry request signal, receive an entry grant input from the human driller granting entry to the human worker to enter the restricted area, and output a stop control command to the equipment located in the restricted area to cause the equipment to stop operating in response to the received entry grant input. The entry input device may be or comprise a push button. The entry request indicator may be or comprise a visual indicator output via at least one of a light emitting device and a video output device and/or an audio indicator output via an audio speaker. The stop control command may be a first stop control command, and the processing device may be operable to output a second stop control command to the equipment located in the restricted area to cause the equipment to stop operating in response to the received entry request signal.

The system may comprise a plurality of presence detection sensors each disposed on the drill floor and operable to output a presence detection signal indicative of detection of the human worker entering the restricted area, and the processing device may be communicatively connected with the presence detection sensors and be operable to receive the presence detection signal and to output a stop control command to the equipment to cause the equipment to stop operating in response to the received presence detection signal. At least one of the presence detection sensors may be or comprise a light curtain. At least one of the presence detection sensors may be or comprise a rope pull switch.

The system may comprise an exit input device disposed on the drill floor and operable to output an exit confirmation signal when manually operated by the human worker exiting the restricted area, and the processing device may be communicatively connected with the exit input device and be operable to receive the exit confirmation signal and to output a start control command to the equipment located in the restricted area to cause the equipment to start operating in response to the received exit confirmation signal.

The equipment may be or comprise at least one of drill string slips, a drawworks, an iron roughneck, a catwalk, a top drive, a tubular delivery arm, and a lower stabilization arm.

The present disclosure also introduces a method comprising commencing operation of a processing device to operate a system for maintaining safety of a human worker in a restricted area of a drill floor during drilling operations performed at least partially by equipment located in the restricted area, wherein the processing device: receives a presence detection signal indicative of detection of the human worker entering the restricted area; outputs a first stop control command to the equipment to cause the equipment to stop operating in response to the received presence detection signal; receives an entry request signal indicative of intent of the human worker to enter the restricted area; outputs an entry request indicator via an output device to a human driller within a drill rig control center in response to the received entry request signal; receives an entry grant input from the human driller granting entry to the human worker to enter the restricted area; and outputs a second stop control command to the equipment located in the restricted area to cause the equipment to stop operating in response to the received entry grant input.

The processing device may further receives an exit confirmation signal from an exit input device upon being manually operated by the human worker exiting the restricted area, and output a start control command to the equipment located in the restricted area to cause the equipment to start operating in response to the received exit confirmation signal.

The processing device may further receive a presence confirmation signal from a manually operated presence confirmation sensor disposed in the restricted area away from a movement path of the equipment upon being manually operated by the human worker in the restricted area, output limited operation control commands to the equipment located in the restricted area to cause the equipment to start operating in a limited manner while the presence confirmation signal is being received, and output a third stop control command to the equipment to cause the equipment to stop operating when the presence confirmation signal is no longer being received. The manually operated presence confirmation sensor may be or comprise at least one of a foot pedal and a push button.

The processing device may further output a third stop control command to the equipment located in the restricted area to cause the equipment to stop operating in response to the received entry request signal.

The first stop control command may cause the equipment to stop operating immediately, and the second stop control command may cause the equipment to ramp-down operations before the equipment stops operating.

The presence detection signal may be received from a presence detection sensor disposed on the drill floor upon detection of the human worker entering the restricted area. The presence detection sensor may be or comprise a rope pull switch.

The entry request signal may be received from an entry input device disposed on the drill floor upon being manually operated by the human worker intending to enter the restricted area. The entry input device may be or comprise a push button.

The entry request indicator may be or comprise a visual indicator output via at least one of a light emitting device and a video output device and/or an audio indicator output via an audio speaker.

The equipment may be or comprise at least one of drill string slips, a drawworks, an iron roughneck, a catwalk, a top drive, a tubular delivery arm, and a lower stabilization arm.

The processing device may cause red lights to light up when the equipment is operating and yellow lights to light up in response to receiving at least one of the presence detection signal and the received entry grant input.

The foregoing outlines features of several implementations so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the implementations introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to permit the reader to quickly ascertain the nature of the technical disclosure. It is submitted with the understanding that it will not be used to interpret or limit the scope or meaning of the claims.

What is claimed is:

1. An apparatus comprising:
   a system for maintaining safety of a human worker in a restricted area of a drill floor during drilling operations performed at least partially by equipment located in the restricted area, wherein the system comprises:
   a plurality of presence detection sensors each disposed on the drill floor and operable to output a presence detection signal indicative of detection of the human worker entering the restricted area;
   an entry input device disposed on the drill floor and operable to output an entry request signal when manually operated by the human worker intending to enter the restricted area;
   a manually operated presence confirmation sensor disposed in the restricted area; and
   a processing device comprising a processor and a memory storing computer program code, wherein the processing device is communicatively connected with the equipment, the presence detection sensors, and the entry input device, and wherein the processing device is operable to:
   receive the presence detection signal;
   output a first stop control command to the equipment to cause the equipment to stop operating in response to the received presence detection signal;
   receive the entry request signal;
   output an entry request indicator via an output device to a human driller within a drill rig control center in response to the received entry request signal;
   receive an entry grant input from the human driller granting entry to the human worker to enter the restricted area;
   output a second stop control command to the equipment located in the restricted area to cause the equipment to stop operating in response to the received entry grant input; and
   responsive to continuous actuation of the manually operated presence confirmation sensor in the restricted area by the human worker, allow for operation of at least one piece of the equipment.

2. The apparatus of claim 1 wherein the system further comprises an exit input device disposed on the drill floor and operable to output an exit confirmation signal when manually operated by the human worker exiting the restricted area, wherein the processing device is communicatively connected with the exit input device, and wherein the processing device is further operable to:
   receive the exit confirmation signal; and
   output a start control command to the equipment located in the restricted area to cause the equipment to start operating in response to the received exit confirmation signal.

3. The apparatus of claim 1 wherein the system further comprises the manually operated presence confirmation sensor disposed in the restricted area at a location away from a movement path of the equipment, and wherein the processing device is further operable to:
   receive a presence confirmation signal responsive to actuation of the manually operated presence confirmation sensor;
   output limited operation control commands to the equipment located in the restricted area to cause the equipment to start operating in a limited manner while the presence confirmation signal is being received; and
   output a third stop control command to the equipment to cause the equipment to stop operating when the presence confirmation signal is no longer being received.

4. The apparatus of claim 1 wherein the processing device is further operable to output a third stop control command to the equipment located in the restricted area to cause the equipment to stop operating in response to the received entry request signal.

5. The apparatus of claim 1 wherein the first stop control command causes the equipment to stop operating immediately, and wherein the second stop control command causes the equipment to ramp-down operations before the equipment stops operating.

6. The apparatus of claim 1 wherein the equipment is or comprises at least one of:
   drill string slips;
   a drawworks;
   an iron roughneck;
   a catwalk;
   a top drive;
   a tubular delivery arm; and
   a lower stabilization arm.

7. The apparatus of claim 1 wherein at least one of the presence detection sensors is or comprises a rope pull switch.

8. The apparatus of claim 1 wherein the entry request indicator is or comprises a: visual indicator output via at least one of a light emitting device and a video output device; and/or
   an audio indicator output via an audio speaker.

9. The apparatus of claim 1 wherein:
   the system further comprises:
      a plurality of red lights disposed on the drill floor; and
      a plurality of yellow lights disposed on the drill floor;
   the processing device is communicatively connected with the red lights and the yellow lights; and
   the processing device is further operable to:
      cause the red lights to light up when the equipment is operating; and
      cause the yellow lights to light up in response to receiving at least one of the presence detection signal and the received entry grant input.

10. An apparatus comprising:
    a system for maintaining safety of a human worker in a restricted area of a drill floor during drilling operations performed at least partially by equipment located in the restricted area, wherein the system comprises:
       a manually operated presence confirmation sensor disposed in the restricted area away from a movement path of the equipment and operable to output a presence confirmation signal when manually operated by the human worker in the restricted area; and
       a processing device comprising a processor and a memory storing computer program code, wherein the processing device is communicatively connected with the equipment and the manually operated presence confirmation sensor, and wherein the processing device is operable to:
          receive the presence confirmation signal; and
          output limited operation control commands to the equipment located in the restricted area to cause the equipment to start operating in a limited manner in response to the received presence confirmation signal.

11. The apparatus of claim 10 wherein the limited operation control commands cause a predetermined one or more instances, but not each instance, of the equipment to operate.

12. The apparatus of claim 10 wherein the limited operation control commands cause a predetermined one or more instances of the equipment to operate at a reduced speed of operation.

13. The apparatus of claim 10 wherein the processing device is further operable to:
    output the limited operation control commands to the equipment while the presence confirmation signal is being received; and
    output a stop control command to the equipment to cause the equipment to stop operating when the presence confirmation signal is no longer being received.

14. The apparatus of claim 10 wherein the manually operated presence confirmation sensor is or comprises at least one of a foot pedal and a push button.

15. The apparatus of claim 10 wherein the system further comprises an entry input device disposed on the drill floor and operable to output an entry request signal when manually operated by the human worker intending to enter the restricted area, wherein the processing device is communicatively connected with the entry input device, and wherein the processing device is further operable to:
    receive the entry request signal;
    output an entry request indicator via an output device to a human driller within a drill rig control center in response to the received entry request signal;
    receive an entry grant input from the human driller granting entry to the human worker to enter the restricted area; and
    output a stop control command to the equipment located in the restricted area to cause the equipment to stop operating in response to the received entry grant input.

16. The apparatus of claim 10 wherein the system further comprises a plurality of presence detection sensors each disposed on the drill floor and operable to output a presence detection signal indicative of detection of the human worker entering the restricted area, wherein the processing device is communicatively connected with the presence detection sensors, and wherein the processing device is further operable to:
    receive the presence detection signal; and
    output a stop control command to the equipment to cause the equipment to stop operating in response to the received presence detection signal.

17. The apparatus of claim 10 wherein the system further comprises an exit input device disposed on the drill floor and operable to output an exit confirmation signal when manually operated by the human worker exiting the restricted area, wherein the processing device is communicatively connected with the exit input device, and wherein the processing device is further operable to:
    receive the exit confirmation signal; and
    output a start control command to the equipment located in the restricted area to cause the equipment to start operating in response to the received exit confirmation signal.

18. A method comprising:
    commencing operation of a processing device to operate a system for maintaining safety of a human worker in a restricted area of a drill floor during drilling operations performed at least partially by equipment located in the restricted area wherein the system comprises a manually operated presence confirmation sensor disposed in the restricted area, and wherein the processing device:
       receives a presence detection signal indicative of detection of the human worker entering the restricted area;
       outputs a first stop control command to the equipment to cause the equipment to stop operating in response to the received presence detection signal;

receives an entry request signal indicative of intent of the human worker to enter the restricted area;

outputs an entry request indicator via an output device to a human driller within a drill rig control center in response to the received entry request signal;

receives an entry grant input from the human driller granting entry to the human worker to enter the restricted area;

outputs a second stop control command to the equipment located in the restricted area to cause the equipment to stop operating in response to the received entry grant input; and responsive to continuous actuation of the manually operated presence confirmation sensor in the restricted area by the human worker, allows for operation of at least one piece of the equipment.

19. The method of claim 18 wherein the processing device further:

receives an exit confirmation signal from an exit input device upon being manually operated by the human worker exiting the restricted area; and outputs a start control command to the equipment located in the restricted area to cause the equipment to start operating in response to the received exit confirmation signal.

20. The method of claim 18 wherein the processing device further:

receives a presence confirmation signal from the manually operated presence confirmation sensor disposed in the restricted area away from a movement path of the equipment upon being manually operated by the human worker in the restricted area;

outputs limited operation control commands to the equipment located in the restricted area to cause the equipment to start operating in a limited manner while the presence confirmation signal is being received; and outputs a third stop control command to the equipment to cause the equipment to stop operating when the presence confirmation signal is no longer being received.

* * * * *